(12) United States Patent
Venesio

(10) Patent No.: US 12,454,692 B2
(45) Date of Patent: Oct. 28, 2025

(54) ANTISENSE OLIGONUCLEOTIDE SEQUENCES FOR SILENCING THE HUMAN L1-MET TRANSCRIPT IN TUMORS

(71) Applicant: Fondazione del Piemonte per l'Oncologia, Turin (IT)

(72) Inventor: Tiziana Venesio, Turin (IT)

(73) Assignee: Fondazione del Piemonte per l'Oncologia, Turin (IT)

( * ) Notice: Subject to any disclaimer, the term of this patent is extended or adjusted under 35 U.S.C. 154(b) by 780 days.

(21) Appl. No.: 17/776,399

(22) PCT Filed: Nov. 13, 2020

(86) PCT No.: PCT/IT2020/050282
§ 371 (c)(1),
(2) Date: May 12, 2022

(87) PCT Pub. No.: WO2021/095080
PCT Pub. Date: May 20, 2021

(65) Prior Publication Data
US 2022/0411803 A1    Dec. 29, 2022

(30) Foreign Application Priority Data
Nov. 15, 2019    (IT) ................ 102019000021327

(51) Int. Cl.
*C12N 15/113*    (2010.01)
*A61K 31/713*    (2006.01)
*A61K 45/06*    (2006.01)

(52) U.S. Cl.
CPC ........ *C12N 15/1137* (2013.01); *A61K 31/713* (2013.01); *A61K 45/06* (2013.01); *C12N 2310/11* (2013.01); *C12N 2320/31* (2013.01)

(58) Field of Classification Search
CPC ............. C12N 15/113; C12N 15/1137; C12N 2310/11; C12N 2310/113; C12N 2310/315; C12N 2310/3231; C12N 2320/31; A61K 31/713; A61K 48/00
See application file for complete search history.

(56) References Cited

FOREIGN PATENT DOCUMENTS

| CN | 106103739 A | 11/2016 |
|----|-------------|---------|
| WO | WO 2015/102536 | 7/2015 |

OTHER PUBLICATIONS

International Search Report & Written Opinion issued in corresponding Application No. PCT/IT2020/050282 on May 20, 2021.

Berrino, et al., "L1-MET transcription silencing modulates MET and EGFR gene and their protein expression and induces apoptosis and cell-death in different types of cancer cells." Cancer Res (2019) 79 (13_Supplement): 261.

Beck et al., "Line-1 Retrotransposition Activity in Human Genomes." Cell. Jun. 25, 2010; 141(7): 1159-1170. Doi: 10.1016/j.cell.2010.05.021.

(Continued)

*Primary Examiner* — Terra C Gibbs
(74) *Attorney, Agent, or Firm* — KNOBBE, MARTENS, OLSON & BEAR, LLP

(57) ABSTRACT

The present invention concerns the use of antisense oligonucleotides to induce the death of several types of human cancer cells by silencing human L1-MET, which is a non coding transcript specifically transcribed in tumour cells.

10 Claims, 8 Drawing Sheets
Specification includes a Sequence Listing.

(56) References Cited

OTHER PUBLICATIONS

Berrino, et al., "Abstract 261: L1-MET transcription silincing modulates MET and EGFR gene and their protein expression and induces apotosis and cell-death in different types of cancer cells." Cancer Res (2019) 79 (13_Supplement): 261.
Bo et al., "Selection of antisense oligonucleotides bsed on multiple predicted target mRNA structures." BMC Bioinformatics 2006, 7:122. DOI: 10.1186/1471-2105-7-122.
Brouha, et al., "Hot L1s account for the bulk of retrotransposition in the human population." PNAS 100: 9, 5280-5285 (2003).
Denli et al., "Primate-Specific ORF0 Contributes to Retrotransposon-Mediated Diversity." Cell 163, 583-593 (2015).
Dobin et al., "Star: ultrafast universal RNA-seq aligner." Bioinformatics 29:1, 15-21 (2012). DOI: 10.1093/bioinformatics/bts635.
Frankish et al., "Gencode reference annotation for the human and mouse genomes." Nucleic Acids Research, 2019, vol. 47, Database Issue. DOI: 10.1093/nar/gky955.
Fusco et al., "Antisense Oligonucleotide: Basic Concepts and Therapeutic Application in Inflammatory Bowel Disease." (2019) Front. Pharmacol. 10:305. DOI: 10.3389/phar.2019.00305.
Gary D. Swergold, "Identification, Characterization, and Cell Specificity of a Human Line-1 Promoter." Mol. and Cellular Bio. 10:12, 6718-6729 (1990).
Liao et at., "featureCounts: an efficient general purpose program for assigning sequence reads to genomic features." Bioinformatics 30:7, 923-930 (2013). DOI: 10.1093/bioinformatics/btt656.
Mart Speek, "Antisense Promoter of Human L1 Retrotransposon Drives Transcription of Adjacent Cellular Genes." Mol. and Cellular Bio., 21:6, 1973-1985 (2000). DOI: 10.1128/MCB.21.6.1973-1985.2001.
Miglio, et al., "The expression of LINE1-MET chimeric transcript identifies a subgroup of aggressive breast cancers." Int. J. Cancer: 143, 2838-2848 (2018).
Nigumann et al., "Many Human Genes Are Transcribed from the Antisense Promoter of L1 Retrotransposon." Genomics 79:5 (2002). DOI: 10.1006/geno.2002.6758.
Shao et al., "Rational design and rapid screening of antisense oligonucleotides for prokaryotic gene modulation." Nucleic Acids Research, 2006, 34:19. DOI: 10.1093/nar/gkl715.
Stanley T. Crooke, "Molecular Mechanisms of Antisense Oligonucleotides." Nucleic Acid Therapeutics 27:2 (2017). DOI: 10.1089/nat.2016.0656.
Weber et al., "Demethylation of a Line-1 antisense promoter in the cMet locus inpairs Met signalling through induction of illegitimate transcription." Oncogene (2010) 29, 5775-5784.
Wolff et al., "Hypomethylation of a Line-1 Promoter Activates an Alternate Transcript of the MET Oncogene in Bladders with Cancer." PloS Genet 6(4): e1000917. Doi: 10.1371/journal.pgen.100917.
Xiulong Shen and David R. Corey, "Chemistry, mechanism and clinical status of antisense oligonucleotides and duplex RNAs." Nucleic Acids Research, 2018, 46:4. DOI: 10.1093/nar/gkx1239.
Office Action issued in corresponding Chinese Patent Application No. 202080079454.6, dated Apr. 9, 2025, in 13 pages.

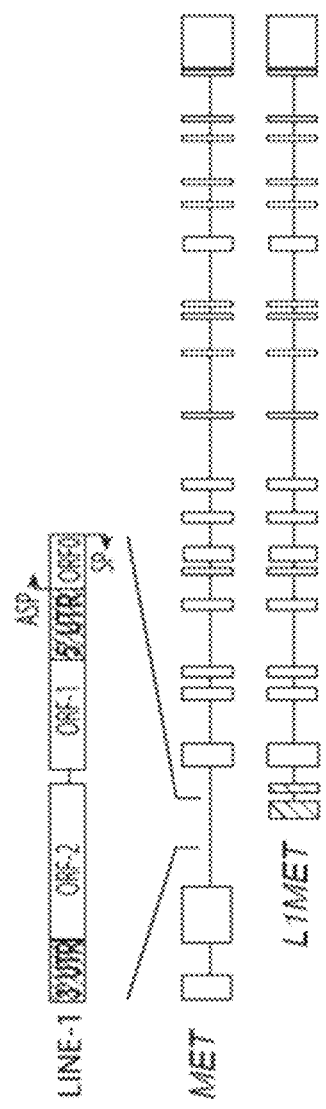

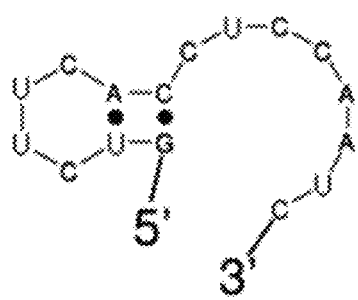
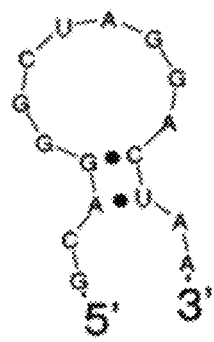
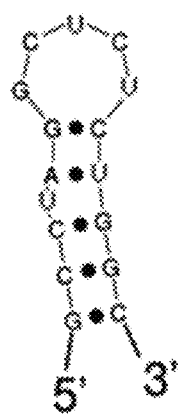
Fig. 3

ANTISENSE OLIGONUCLEOTIDE SEQUENCES FOR SILENCING THE HUMAN L1-MET TRANSCRIPT IN TUMORS

FIELD

The present invention concerns antisense oligonucleotide sequences for silencing the human L1-MET transcript in tumours.

In particular, the present invention concerns the use of antisense oligonucleotides to induce the death of several types of human cancer cells by silencing human L1-MET, which is a non-coding transcript specifically transcribed in tumour cells.

REFERENCE TO SEQUENCE LISTING

A Sequence Listing submitted as an ASCII text file via EFS-Web is hereby incorporated by reference in accordance with 35 U.S.C. § 1.52(e). The name of the ASCII text file for the Sequence Listing is BARZ063.001APC_Seq_List. TXT, the date of creation of the ASCII text file is Jun. 26, 2025, and the size of the ASCII text file is 18,577 bytes.

BACKGROUND

Nowadays research is focused on finding new therapies for the treatment of cancer and, in particular, new therapies that are selective against cancer cells.

In fact, it is well known that anticancer therapies, such as chemotherapy, cause the death of both cancer cells and normal cells. The death of normal cells can cause some unpleasant side effects.

In order to solve this problem, in the last 20 years new therapeutic strategies have been developed to target specific molecules that are more expressed in cancer cells. Patient private molecular landscape addresses the physics to a specific drug, reducing the off-targets. However the molecules targeted by this drugs not only are present on the cancer cell membrane, but also in some normal cell. Moreover, the presence of mutation in other genes can lead to a loss of effective, i.e. in colorectal cancer, the presence of mutation in KRAS gene lead ineffective the use of a drug that bind to EGFR and block the pathway. In lung cancer the presence of mutation in EGFR can lead to a better response to the EGFR inhibitors, but when a mutation of resistance rises up, the drug become ineffective.

In the light of the above, it is therefore apparent the need to provide new anticancer therapies able to overcome the disadvantages of the known anticancer therapies.

It is known that long interspersed nuclear elements (LINE-1) are retrotransposable elements representing about 20% of the human genome. Line-1 retain the ability to transpose themselves into new chromosomal region sites when they are activated by the hypomethylation of the CpG islands located in their promoter regions [1]. Only few of these sequences, usually located in non-coding regions, are retrotransposition-competent, but generally remain inactive for almost the entire life [2]. When demethylated, the LINE-1 promoter can act as a sense promoter, leading the transcription of the two open reading frames (ORF-1 and ORF-2), or as an antisense promoter [3]. The activity of the antisense promoter, driving the transcription of the opposite strand in respect of the LINE-1 direction, can cause the onset of a transcript including the neighbourhood sequence [4]. At this regard, a new primate-specific open reading frame (ORF-0), recently discovered within the 5' UTR of the LINE-1 sequence, was shown to be the origin of the proximal exon fusion transcripts, using two splicing donor sites [5]. The LINE-1 sequence located within the intron 2 of the human MET gene, known as L1-MET (FIG. 1), belongs to the primate subfamily and is not able to retrotranspose. However, the promoter region has been fully retained, thus allowing the antisense promoter to be activated by hypomethylation with the generation of an alternative transcript originating from the ORF-0 region and containing the neighbourhood MET sequence. The L1-MET transcript was first described in 2002 [6], but the characterization of its full length was achieved only in 2018, as described by Miglio et al, 2018 (FIG. 1) [7]. In this latter study, it is shown that the transcript starts from the ORF-0 and ends at the MET 3' UTR, including 6 different splicing variants that are derived from the combination of two splicing donor sites with three different acceptors sites, two of them located in the intron 2 of MET gene. The length of L1-MET transcript and the absence of a coding open reading frame suggest a function as a long non-coding RNA. It was also demonstrated that, although L1-MET does not encode for a functional protein, the presence of the 3'UTR and the polyA region confer the transcript the ability to be transported from the nucleus to the cytoplasm. This feature, together with its length, suggests the possible role as a long non coding RNA. Up to the present, only two studies tried to investigate the biological function of L1-MET. In one, Weber et al observed a reduced MET protein level after having induced the expression of L1-MET by knocking down the DNA methyltransferase protein and promoted the transcription by hypomethylation [8]. In the other, Wolff et al reported the presence of a truncated MET isoform after having transfected L1-MET in cell lines [9]. However, in Miglio et al, 2018 [7] no evidence of a truncated MET protein was evidenced by both western blot and informatics prediction tool.

It has been shown that the activation of the L1-MET antisense promoter is a tumour specific mechanism since both experimental investigation and in silico analyses clearly showed that there is no evidence of the L1-MET expression in normal tissues [7].

SUMMARY

According to the present invention it has now been shown that the silencing of the L1-MET transcript lead to a remarkable death of tumour cells but not of the normal ones suggesting L1-MET as a promising target for cancer treatment.

Among the available therapeutic strategies to target this sequence, antisense oligonucleotides, mainly used for diseases other than cancer, seem to be the more appropriate [10].

In particular, according to the present invention it has been shown that the silencing of the L1-MET transcript, carried out by antisense oligonucleotides targeting a specific regulating sequence of L1-MET, induces selective death of different type of cancer cells whereas non transformed cells are not affected. These results support the use of these oligonucleotide sequences to induce tumour cell death.

Specifically, according to the present invention a specific sequence has been identified, which covers 76 bp in MET intron 2 and becomes part of the L1-MET transcript. This sequence can be advantageously targeted in order to cause the early degradation of the human L1-MET transcript.

In particular, according to the present invention, 11 antisense oligonucleotides have been identified by in silico analysis, which are able to selectively silence the L1-MET transcript. In addition, three of them have been tested in in vitro experiments.

The antisense oligonucleotides of the present invention can be used as pharmacological compounds both singly and in combination.

Therefore, the antisense oligonucleotides of the present invention can be advantageously used in order to induce a massive selective death of human tumour cells positive for the expression of the L1-MET transcript. The high selectivity of antisense oligonucleotides of the present invention against the tumour cells is due to the absence of the L1-MET expression in normal tissues and its specific tumour transcription activation by hypomethylation.

The antisense oligonucleotides can be chemically modified in order to administer them to patients without a vector or conjugated with a vector to increase the transfection efficiency of the tumour cells. Example of vectors that can be used to administer ASO are liposomes or nanoparticles, allowing a more rapid internalization but that can show some limitation such as a degradation by the reticuloendothelial system.

Although in the past antisense oligonucleotides exhibited some limitations, mostly due to the short time in the blood and the rapid clearance, encouraging results have been recently obtained thanks to the introduction of chemical modifications (i.e. locked nucleic acid—LNA, phosphorothioate backbone, 2'-ribose modification), allowing the direct administration of the compound [11]. These chemical changes increase the binding to serum protein reducing the clearance by the liver and boosting the time available for uptake into target cells. In the last years several antisense oligonucleotides have been approved by the FDA for the treatment of different diseases (i.e. spinal muscular atrophy, homozygous familial hypercholesterolemia).

It is therefore specific object of the present invention an antisense oligonucleotide targeting the region of L1-MET transcript encoded by GCAGAAAATGTGCTAGATTG-GAGGTGAAGACCCTGGAGCCAGAGAG CCTAGGCTTAGTCCTAGCCCTGCACTGAAG (SEQ ID NO:1).

According to the present invention, said antisense oligonucleotide can target a region of L1-MET transcript encoded by GCAGAAAATGTGCTAGATTGGAGGTGAAGAC (SEQ ID NO:2) or TTAGTCCTAGCCCTGCACTGAAG (SEQ ID NO:3).

In addition, according to the present invention, said antisense oligonucleotide can comprise a sequence from 7 to 50 nucleotides, preferably from 12 to 30 nucleotides, more preferably from 15 to 23 nucleotides. For example, said antisense oligonucleotide can comprise 16 nucleotides when said antisense oligonucleotide comprises both deossiribonucleotides and ribonucleotides.

According to the present invention, said antisense oligonucleotide is complementary to the target region of L1-MET transcript and comprises or consists of GUCUUCACCUC-CAAUC ID (SEQ NO: 4), GCAGGGCUAGGACUAA (SEQ ID NO:5), GCCUAGGCUCUCUGGC (SEQ ID NO:6), CUAGCACAUUUUCUGC (SEQ ID NO:7), CUC-CAAUCUAGCACAU (SEQ ID NO:8), ACCUCCAAUC-UAGCAC (SEQ ID NO: 9), CUAGGCUCUCUGGCUC (SEQ ID NO:10), CUAAGCCUAAGGCUCUC (SEQ ID NO:11), GUGCAGGGCUAGGACU (SEQ ID NO:12), AGUGCAGGGCUAGGAC (SEQ ID NO:13) or CUUCAGUGCAGGGCUA (SEQ ID NO:14), preferably SEQ ID NO:4 or SEQ ID NO:5, more preferably SEQ ID NO:5.

According to the present invention, one, more than one or all the nucleotides of the above-mentioned antisense oligonucleotides can be modified with the proviso that an antisense oligonucleotide does not comprise only deoxyribonucleotides or only nucleotides with modified deoxyribose. In particular, the nucleotides can be ribonucleotides, deoxyribonucleotides, nucleotides with modified ribose or deoxyribose. In addition, said ribonucleotides, deoxyribonucleotides, or nucleotides with modified ribose and/or deoxyribose optionally can have a modified phosphate group. Therefore, each of said antisense oligonucleotide can comprise ribonucleotides, a combination and of ribonucleotides deoxyribonucleotides, and/or nucleotides with modified ribose and/or deoxyribose, wherein the phosphate group is optionally modified.

In particular, the modified oligonucleotides can comprise nucleotides with sugar modifications, such as 2'-O-MOE, 2'-O-Me, LNA, (S)-cEt, 2'-F RNA, Morpholino (PMO), and/or nucleotides with modifications on the phosphate group, such as phosphodiester (PO), phosphorothioate (PS), phosphorodithioate, Thio-phosphoramidate. Modifications on the phosphate group can be applied to any nucleotide, be it DNA, RNA or a nucleotide with modifications on the sugar.

According to an embodiment of the present invention, the antisense oligonucleotides can comprise modified nucleotides having both an LNA modification and a phosphorothioate (PS) modification.

According to a specific embodiment, the oligonucleotides according to the present invention can comprise flanking modified nucleotides with both LNA and PS modifications at the two ends of the molecule and DNA nucleotides in the central part of the molecule. This kind of structure advantageously amplifies the ASO-related target degradation by RNase.

The LNA modification advantageously increases the binding specificity to the RNA target and it confers resistance to nucleases.

The PS modification advantageously increases the binding with serum proteins (albumin), favouring their maintenance in the bloodstream. In addition, it reduces the renal clearance, reducing the elimination rate by the kidneys when the ASO is in the bloodstream.

In addition, the combination of the above mentioned modifications (LNA and PS) provides an improved transfection efficiency, allowing a transfection even without vectors (such as lipofectamine, liposomes or nanoparticles).

A further object of the present invention is a pharmaceutical composition comprising one or more of the antisense nucleotides as defined above, as active principles, in association with one or more excipients and/or adjuvant.

According to the present invention, said pharmaceutical composition can further comprise one or more anticancer drugs.

The present invention concerns also antisense oligonucleotide as defined above or pharmaceutical composition as defined above, for use in the treatment of L1-MET expressing tumours, such as triple-negative breast cancer, lung adenocarcinoma or colo-rectal cancer.

A further object of the present invention is a combination of one or more antisense oligonucleotides as defined above with one or more anticancer drugs, for the separate or sequential use in the treatment of L1-MET expressing tumours, such as triple-negative breast cancer.

According to the present invention, "separate use" is understood as meaning the administration, at the same time, of the two compounds of the combination according to the invention in distinct pharmaceutical forms.

"Sequential use" is understood as meaning the successive administration of the two compounds of the combination according to the invention, each in a distinct pharmaceutical form.

Specific examples of antisense compounds useful in this invention include oligonucleotides containing modified backbones or non-natural internucleoside linkages. Oligonucleotides having modified backbones include those that retain a phosphorus atom in the backbone and those that do not have a phosphorus atom in the backbone. Modified oligonucleotides that do not have a phosphorus atom in their internucleoside backbone can also be considered to be oligonucleosides.

In other oligonucleotide mimetics, both the sugar and the internucleoside linkage, i.e., the backbone, of the nucleotide units are replaced with novel groups. The base units are maintained for hybridization with an appropriate nucleic acid target compound. One such oligomeric compound, an oligonucleotide mimetic that has been shown to have excellent hybridization properties, is referred to as a peptide nucleic acid (PNA). In PNA compounds, the sugar-backbone of an oligonucleotide is replaced with an amide containing backbone, in particular an aminoethylglycine backbone. The nucleobases are retained and are bound directly or indirectly to aza nitrogen atoms of the amide portion of the backbone.

A further modification can include Locked Nucleic Acids (LNAs), in which the 2'-hydroxyl group is linked to the 3' or 4' carbon atom of the sugar ring thereby forming a bicyclic sugar moiety. The linkage can be a methelyne ($—CH_2-$)n group bridging the 2' oxygen atom and the 4' carbon atom, wherein n is 1 or 2.

Other modifications can include 2'-methoxy (2'-O—$CH_3$), 2'-aminopropoxy (2'-O$CH_2CH_2CH_2NH_2$), 2'-allyl (2'-$CH_2$—CH—$CH_2$); 2'-O-allyl (2'-O—$CH_2$—CH—$CH_2$) and 2'-fluoro (2'-F).

Modified nucleobases may also include those in which the purine or pyrimidine base is replaced with other heterocycles, for example 7-deaza-adenine, 7-deazaguanosine, 2-aminopyridine and 2-pyridone. Some modified nucleobases are particularly useful for increasing the binding affinity of the oligonucleotides of the invention. These include 5-substituted pyrimidines, 6-azapyrimidines and N-2, N-6 and O-6 substituted purines, including 2-aminopropyl-adenine, 5-propynyluracil and 5-propynylcytosine.

The oligonucleotide of the invention may be formed as composite structures of two or more oligonucleotides, modified oligonucleotides, oligonucleosides and/or oligonucleotide mimetics. Such oligonucleotides have also been referred to in the art as hybrids or gapmers.

BRIEF DESCRIPTION OF THE FIGURES

The present invention now will be described by an illustrative, but not limitative way, according to preferred embodiments thereof, with particular reference to the enclosed drawings, wherein:

FIG. 1 shows the graphical representation of the L1-MET transcript arising from the L1 element located within intron 2 of MET [7].

FIG. 2 shows the mapping sites of antisense oligonucleotides along the 76 bp target fragment of L1-MET. For illustrative purpose, the figure shows SEQ ID NO: 16, which is nucleotides 1-420 of SEQ ID NO:15 in order to show the position of the 76 bp target fragment in SEQ ID NO:15.

FIG. 3 shows the secondary structure of the three design antisense oligonucleotides, SEQ ID NO: 4, 5, and 6, predicted by in silico analysis.

DETAILED DESCRIPTION

Figure 4:
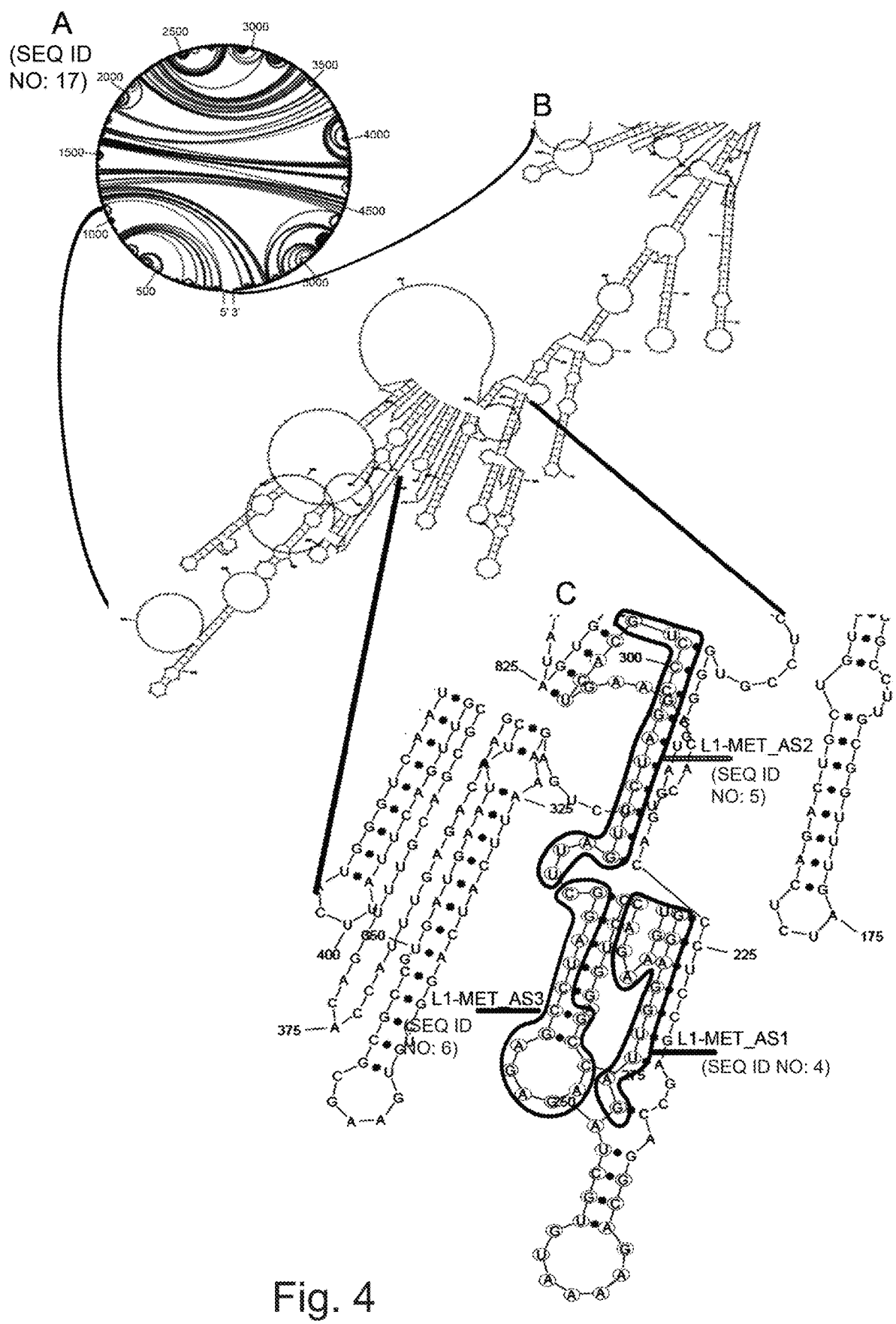
FIG. 4 shows the predicted secondary structure of the L1-MET sequence SEQ ID NO: 17. Complementary region of the antisense oligonucleotides is highlighted by bolt lines.

Example 1: In Silico Identification and Characterization of the Oligonucleotides Targeting L1-MET According to the Present Invention and In Vitro Silencing of L1-MET Material and Methods The human biological samples used in this study belonged to a healthy donor who was an internal collaborator of the laboratory and gave the consent for collecting the blood samples and for using them for the experiments.

For the experiments herewith described no genetically modified organisms (GMOs) were used.

Cancer Cell Lines

MDA-MB231 and MCF-7 cell lines were obtained from NCI-60 panel, EBC1 (cat. JCRB0820) were obtained from Health Science Research Resources Bank (HSRRB), and A549 (cat. CCL-185) and MRC5 (cat. CCL-171) from American Type Culture Collection (ATCC). EBC1 and A549 were grown in RPMI supplemented with 10% FBS, for MDA-MB231 high-glucose DMEM with 10% FBS was used, for MCF7 high-glucose DMEM with 10% FBS and 10 µg/mL insulin was used, whereas MRC5 were grown in MEM with 10% FBS. Their genetic identity was confirmed by short tandem repeat profiling (PowerPlex® 16 HS System, Promega, Madison, WI), last repeated in June 2019. Cells were periodically tested for *mycoplasma* contamination using Venor GM kit (Minerva Biolabs, Berlin, Germany). Normal lymphocytes from healthy donor were obtained from peripheral blood by centrifugation using the Lympholyte cell separation media (Cedarlane), and then were grown in RPMI supplemented with 10% FBS.

Antisense Oligonucleotide Selection

A specific 76 bp sequence of the L1-MET transcript was selected and investigated by in silico analysis in order to identify the best antisense oligonucleotides (ASOs), according to selection criteria previously reported [12]. The ASO-most accessible sequences were identified by using five different ASO designer tools.

Here below the complete DNA sequence (SEQ ID NO:15) of the L1-MET transcript is shown, wherein the specific 76 bp fragment target of the antisense oligonucleotides is highlighted (bolt and underlined).

```
CTTTTTGTTTGTCTGTGCCCTGCCCCGAGAGGTGGAGCCTACAGAGGCAGGCAGGCCTCC    60
TTGAGCTCTGGTGGGCTCCACCCAGTTCTAGCTTCCAGGCTGCTTTGTTTACCTAAGCAA   120
GCCTGGGCAATGGCGGGTGCCCCTCCCCCAGCCTCGCTGCCGCCTTGCGGTTTGATCTCA   180
GACTGCTGTGCTAGCAATCAGCGGGACTCCGTGGGCGTAGGACCCTCCGAGCCAGGCAGA   240
AAATGTGCTAGATTGGAGGTGAAGACCCTGGAGCCAGAGAGCCTAGGCTTAGTCCTAGCC   300
CTGCACTGAAGACACTTCTGAGAAATTCATCAGGCTGTGAAGCGCGCCGTGATGAATATC   360
GAACAGAGTTTACCACAGCTTTGCAGCGCGTTGACTTATTCATGGGTCAATTCAGCGAAG   420
TCCTCTTAACATCTATATCCACCTTCATTAAAGGAGACCTCACCATAGCTAATCTTGGGA   480
CATCAGAGGGTCGCTTCATGCAGGTTGTGGTTTCTCGATCAGGACCATCAACCCCTCATG   540
TGAATTTTCTCCTGGACTCCCATCCAGTGTCTCCAGAAGTGATTGTGGAGCATACATTAA   600
ACCAAAATGGCTACACACTGGTTATCACTGGGAAGAAGATCACGAAGATCCCATTGAATG   660
GCTTGGGCTGCAGACATTTCCAGTCCTGCAGTCAATGCCTCTCTGCCCCACCCTTTGTTC   720
AGTGTGGCTGGTGCCACGACAAATGTGCGATCGGAGGAATGCCTGAGCGGGACATGGA    780
CTCAACAGATCTGTCTGCCTGCAATCTACAAGGTTTTCCCAAATAGTGCACCCCTTGAAG   840
GAGGGACAAGGCTGACCATATGTGGCTGGGACTTTGGATTTCGGAGGAATAATAAATTTG   900
ATTTAAAGAAAACTAGAGTTCTCCTTGGAAATGAGAGCTGCACCTTGACTTTAAGTGAGA   960
GCACGATGAATACATTGAAATGCACAGTTGGTCCTGCCATGAATAAGCATTTCAATATGT  1020
CCATAATTATTTCAAATGGCCACGGGACAACACAATACAGTACATTCTCCTATGTGGATC  1080
CTGTAATAACAAGTATTTCGCCGAAATACGGTCCTATGGCTGGTGGCACTTTACTTACTT  1140
TAACTGGAAATTACCTAAACAGTGGGAATTCTAGACACATTTCAATTGGTGGAAAAACAT  1200
GTACTTTAAAAAGTGTGTCAAACAGTATTCTTGAATGTTATACCCCAGCCCAAACCATTT  1260
CAACTGAGTTTGCTGTTAAATTGAAAATTGACTTAGCCAACCGAGAGACAAGCATCTTCA  1320
GTTACCGTGAAGATCCCATTGTCTATGAAATTCATCCAACCAAATCTTTTATTAGTGGTG  1380
GGAGCACAATAACAGGTGTTGGGAAAAACCTGAATTCAGTTAGTGTCCCGAGAATGGTCA  1440
TAAATGTGCATGAAGCAGGAAGGAACTTTACAGTGGCATGTCAACATCGCTCTAATTCAG  1500
AGATAATCTGTTGTACCACTCCTTCCCTGCAACAGCTGAATCTGCAACTCCCCCTGAAAA  1560
CCAAAGCCTTTTTCATGTTAGATGGGATCCTTTCCAAATACTTTGATCTCATTTATGTAC  1620
ATAATCCTGTGTTTAAGCCTTTTGAAAAGCCAGTGATGATCTCAATGGGCAATGAAAATG  1680
TACTGGAAATTAAGGGAAATGATATTGACCCTGAAGCAGTTAAAGGTGAAGTGTTAAAAG  1740
TTGGAAATAAGAGCTGTGAGAATATACACTTACATTCTGAAGCCGTTTTATGCACGGTCC  1800
CCAATGACCTGCTGAAATTGAACAGCGAGCTAAATATAGAGTGGAAGCAAGCAATTTCTT  1860
CAACCGTCCTTGGAAAAGTAATAGTTCAACCAGATCAGAATTTCACAGGATTGATTGCTG  1920
GTGTTGTCTCAATATCAACAGCACTGTTATTACTACTTGGGTTTTTCCTGTGGCTGAAAA  1980
AGAGAAAGCAAATTAAAGATCTGGGCAGTGAATTAGTTCGCTACGATGCAAGAGTACACA  2040
CTCCTCATTTGGATAGGCTTGTAAGTGCCCGAAGTGTAAGCCCAACTACAGAAATGGTTT  2100
CAAATGAATCTGTAGACTACCGAGCTACTTTTCCAGAAGATCAGTTTCCTAATTCATCTC  2160
AGAACGGTTCATGCCGACAAGTGCAGTATCCTCTGACAGACATGTCCCCCATCCTAACTA  2220
GTGGGGACTCTGATATATCCAGTCCATTACTGCAAAATACTGTCCACATTGACCTCAGTG  2280
CTCTAAATCCAGAGCTGGTCCAGGCAGTGCAGCATGTAGTGATTGGGCCCAGTAGCCTGA  2340
TTGTGCATTTCAATGAAGTCATAGGAAGAGGGCATTTTGGTTGTGTATATCATGGGACTT  2400
TGTTGGACAATGATGGCAAGAAAATTCACTGTGCTGTGAAATCCTTGAACAGAATCACTG  2460
```

-continued

```
ACATAGGAGAAGTTTCCCAATTTCTGACCGAGGGAATCATCATGAAAGATTTTAGTCATC  2520

CCAATGTCCTCTCGCTCCTGGGAATCTGCCTGCGAAGTGAAGGGTCTCCGCTGGTGGTCC  2580

TACCATACATGAAACATGGAGATCTTCGAAATTTCATTCGAAATGAGACTCATAATCCAA  2640

CTGTAAAAGATCTTATTGGCTTTGGTCTTCAAGTAGCCAAAGGCATGAAATATCTTGCAA  2700

GCAAAAAGTTTGTCCACAGAGACTTGGCTGCAAGAAACTGTATGCTGGATGAAAAATTCA  2760

CAGTCAAGGTTGCTGATTTTGGTCTTGCCAGAGACATGTATGATAAAGAATACTATAGTG  2820

TACACAACAAAACAGGTGCAAAGCTGCCAGTGAAGTGGATGGCTTTGGAAAGTCTGCAAA  2880

CTCAAAAGTTTACCACCAAGTCAGATGTGTGGTCCTTTGGCGTGCTCCTCTGGGAGCTGA  2940

TGACAAGAGGAGCCCCACCTTATCCTGACGTAAACACCTTTGATATAACTGTTTACTTGT  3000

TGCAAGGGAGAAGACTCCTACAACCCGAATACTGCCCAGACCCCTTATATGAAGTAATGC  3060

TAAAATGCTGGCACCCTAAAGCCGAAATGCGCCCATCCTTTTCTGAACTGGTGTCCCGGA  3120

TATCAGCGATCTTCTCTACTTTCATTGGGGAGCACTATGTCCATGTGAACGCTACTTATG  3180

TGAACGTAAAATGTGTCGCTCCGTATCCTTCTCTGTTGTCATCAGAAGATAACGCTGATG  3240

ATGAGGTGGACACACGACCAGCCTCCTTCTGGGAGACATCATAGTGCTAGTACTATGTCA  3300

AAGCAACAGTCCACACTTTGTCCAATGGTTTTTTCACTGCCTGACCTTTAAAAGGCCATC  3360

GATATTCTTTGCTCTTGCCAAAATTGCACTATTATAGGACTTGTATTGTTATTTAAATTA  3420

CTGGATTCTAAGGAATTTCTTATCTGACAGAGCATCAGAACCAGAGGCTTGGTCCCACAG  3480

GCCACGGACCAATGGCCTGCAGCCGTGACAACACTCCTGTCATATTGGAGTCCAAAACTT  3540

GAATTCTGGGTTGAATTTTTTAAAAATCAGGTACCACTTGATTTCATATGGGAAATTGAA  3600

GCAGGAAATATTGAGGGCTTCTTGATCACAGAAAACTCAGAAGAGATAGTAATGCTCAGG  3660

ACAGGAGCGGCAGCCCCAGAACAGGCCACTCATTTAGAATTCTAGTGTTTCAAAACACTT  3720

TTGTGTGTTGTATGGTCAATAACATTTTTCATTACTGATGGTGTCATTCACCCATTAGGT  3780

AAACATTCCCTTTTAAATGTTTGTTTGTTTTTGAGACAGGATCTCACTCTGTTGCCAGG  3840

GCTGTAGTGCAGTGGTGTGATCATAGCTCACTGCAACCTCCACCTCCCAGGCTCAAGCCT  3900

CCCGAATAGCTGGGACTACAGGCGCACACCACCATCCCCGGCTAATTTTTGTATTTTTTG  3960

TAGAGACGGGGTTTTGCCATGTTGCCAAGGCTGGTTTCAAACTCCTGGACTCAAGAAATC  4020

CACCCACCTCAGCCTCCCAAAGTGCTAGGATTACAGGCATGAGCCACTGCGCCCAGCCCT  4080

TATAAATTTTTGTATAGACATTCCTTTGGTTGGAAGAATATTTATAGGCAATACAGTCAA  4140

AGTTTCAAAATAGCATCACACAAAACATGTTTATAAATGAACAGGATGTAATGTACATAG  4200

ATGACATTAAGAAAATTTGTATGAAATAATTTAGTCATCATGAAATATTTAGTTGTCATA  4260

TAAAAACCCACTGTTTGAGAATGATGCTACTCTGATCTAATGAATGTGAACATGTAGATG  4320

TTTTGTGTGTATTTTTTTAAATGAAAACTCAAAATAAGACAAGTAATTTGTTGATAAATA  4380

TTTTTAAAGATAACTCAGCATGTTTGTAAAGCAGGATACATTTTACTAAAAGGTTCATTG  4440

GTTCCAATCACAGCTCATAGGTAGAGCAAAGAAAGGGTGGATGGATTGAAAAGATTAGCC  4500

TCTGTCTCGGTGGCAGGTTCCCACCTCGCAAGCAATTGGAAACAAAACTTTTGGGGAGTT  4560

TTATTTTGCATTAGGGTGTGTTTTATGTTAAGCAAAACATACTTTAGAAACAAATGAAAA  4620

AGGCAATTGAAAATCCCAGCTATTTCACCTAGATGGAATAGCCACCCTGAGCAGAACTTT  4680

GTGATGCTTCATTCTGTGGAATTTTGTGCTTGCTACTGTATAGTGCATGTGGTGTAGGTT  4740

ACTCTAACTGGTTTTGTCGACGTAAACATTTAAAGTGTTATATTTTTTATAAAAATGTTT  4800

ATTTTTAATGATATGAGAAAAATTTTGTTAGGCCACAAAAACACTGCACTGTGAACATTT  4860
```

```
-continued
TAGAAAAGGTATGTCAGACTGGGATTAATGACAGCATGATTTTCAATGACTGTAAATTGC 4920

GATAAGGAAATGTACTGATTGCCAATACACCCCACCCTCATTACATCATCAGGACTTGAA 4980

GCCAAGGGTTAACCCAGCAAGCTACAAAGAGGGTGTGTCACACTGAAACTCAATAGTTGA 5040

GTTTGGCTGTTGTTGCAGGAAAATGATTATAACTAAAAGCTCTCTGATAGTGCAGAGACT 5100

TACCAGAAGACACAAGGAATTGTACTGAAGAGCTATTACAATCCAAATATTGCCGTTTCA 5160

TAAATGTAATAAGTAATACTAATTCACAGAGTATTGTAAATGGTGGATGACAAAAGAAAA 5220

TCTGCTCTGTGGAAAGAAAGAACTGTCTCTACCAGGGTCAAGAGCATGAACGCATCAATA 5280

GAAAGAACTCGGGGAAACATCCCATCAACAGGACTACACACTTGTATATACATTCTTGAG 5340

AACACTGCAATGTGAAAATCACGTTTGCTATTTATAAACTTGTCCTTAGATTAATGTGTC 5400

TGGACAGATTGTGGGAGTAAGTGATTCTTCTAAGAATTAGATACTTGTCACTGCCTATAC 5460

CTGCAGCTGAACTGAATGGTACTTCGTATGTTAATAGTTGTTCTGATAAATCATGCAATT 5520

AAAGTAAAGTGATGCAACATCTTGTA                                  5546
```

Five antisense oligonucleotides design tools were interrogated and 11 ASOs able to target the specific L1-MET region were identified, as shown in Table 1 reported below.

TABLE 1

| ASO ID | Sequence 5'→3' | Base pair position on L1-MET |
|---|---|---|
| L1-MET_AS1 | GUCUUCACCUCCAAUC (SEQ ID NO: 4) | 251-266 |
| L1-MET_AS2 | GCAGGGCUAGGACUAA (SEQ ID NO: 5) | 289-304 |
| L1-MET_AS3 | GCCUAGGCUCUCUGGC (SEQ ID NO: 6) | 273-288 |
| L1-MET_AS4 | CUAGCACAUUUCUGC (SEQ ID NO: 7) | 236-251 |
| L1-MET_AS5 | CUCCAAUCUAGCACAU (SEQ ID NO: 8) | 243-258 |
| L1-MET_AS6 | ACCUCCAAUCUAGCAC (SEQ ID NO: 9) | 245-260 |
| L1-MET_AS7 | CUAGGCUCUCUGGCUC (SEQ ID NO: 10) | 271-286 |
| L1-MET_AS8 | CUAAGCCUAAGGCUCUC (SEQ ID NO: 11) | 277-292 |
| L1-MET_AS9 | GUGCAGGGCUAGGACU (SEQ ID NO: 12) | 291-306 |
| L1-MET_AS10 | AGUGCAGGGCUAGGAC (SEQ ID NO: 13) | 292-307 |
| L1-MET_AS11 | CUUCAGUGCAGGGCUA (SEQ ID NO: 14) | 296-311 |

Most of the qualitative features of the ASOs (e.g structural, chemical and sequence composition) are strongly dependent to the accessibility of the target mRNA [13, 14]. Using the sFOLD web tool, the secondary structures of the potential ASOs were then characterized in order to check the oligos with the best parameters. In addition, the whole mRNA of L1-MET secondary structure was also characterized, in order to visually inspect the folding features of the target regions. The LNA-Gapmers synthetized by Exiqon (Qiagen) (L1MET_AS1, L1MET_AS2, L1MET_AS3) are characterized by a DNA core region with two flanking RNA sequences, containing a locked nucleic acid modification and a phosphorotioate backbone added to each base pair. In FIG. 2 are shown the mapping sites of the ASO on the 76 bp sequence.

Transient Transfection

All cells were cultured in full media before being transiently transfected with ASO using Lipofectamine RNAiMAX (Thermofisher Scientific), according to manufacturer's protocol. As a control, scrambled LNA GapmeR was transfected. The day of the transfection, cells were harvested and counted, then 600.000 cells/dish were seeded in 10 cm tissue culture dish with the appropriate growing medium in the presence of the transfection mix, composed by lipofectamine and the antisense oligonucleotide at a final concentration of 25 nM. After 24 hours from the transfection, RNA and protein were extracted from cells.

Rna Extraction and qRT-PCR Analysis

RNA was extracted from cell lines using the Maxwell RSC miRNA tissue kit (Promega), following the manufacturer's instruction. RNA quantification was carried out using the DeNovix spectrophotometer. After reverse transcription using the Reverse Transcription system (Promega), quantitative Real-Time PCR (qRT-PCR) was used to investigate the gene expression of L1-MET using primer and PCR condition as previously reported [7]. Briefly, the reaction mix was composed by 1× buffer, 2.5 mM $MgCl_2$, 0.2 mM dNTPs, 0.2 UM of each primer, 2× EvaGreen dye, 0.04 U/µL Taq Polymerase (Promega), and $H_2O$ to a final volume of 25 µL, in the presence of a forward primer located on the 76 bp region of L1-MET and a reverse primer located on the exon 3 of MET. Relative expression quantification (RQ) was calculated according to the following formula, using GAPDH as endogenous control: $RQ=2-(\Delta Ct)$ where $\Delta Ct=$ (Ct L1-MET−Ct GAPDH).

RNAseq Analysis

RNA-seq analysis for gene expression profiles for the A549, EBC1, MDAMB-231 and MCF7 cancer cell lines was performed. In detail, the RNA purified form the cells treated with the L1-MET_AS1 or with the scramble Gapmer was analyzed in three independent replicating experiment, for a total of 24 samples. All the library preparation was performed using the TruSeq stranded mRNA kit (Illumina), starting from 1 µg of total RNA with a RIN>8. Briefly, following the low sample workflow, after the purification of the poly-A RNA (e.g. mRNA) using the poly-T oligo attached magnetic beads, the cDNA was synthetized, that subsequently was end-repaired and adenylated to the 3' end to allow the ligation of the indexed adapters. The pooled libraries where than load on Illumina NextSeq 500/550 instrument to a final concentration of 1.1 pM for single-end 75 bp sequencing. The reads not passing filters according to standard Illumina NextSeq500 procedure were discarded. Passing filters reads were aligned to GRCh38 primary assembly genome, downloaded from GENCODE (version 29) [15] using STAR (version 2.5.4a with custom parameters—outFilterMultimapNmax 10—outFilterMultimapScoreRange 1—outFilterMismatchNmax 999—outFilterMismatchNoverLmax 0.08) [16]. For gene expression quantification read was assigned to exons using subread featureCounts v1.6.3, discarding multi mapping reads and ambiguous reads and summarizing over gene names [17]. As reference transcript annotation GENCODE basic annotation (version 29) was used, complemented with custom tracks of L1-MET transcripts described in Miglio et al, 2018 [7]. The same complemented transcript annotation was used to build the STAR index.

Protein Extraction and Western Blot Analysis

Protein were extracted from cell lines after 24 hours from transfection using hot lysis protocol. Cells were washed three times with PBS before adding a lysis solution, composed by 1M Tris-HCl pH6.8, 10% SDS and H2O to reach the final volume. The lysate was collected in a 1.5 ml tube and incubated at 95° C. for 15 minutes. After sonication and centrifugation at 16,000 g for 5 minutes to eliminate cell debris, proteins were quantified using the spectrophotometer with the Pierce BCA Protein Assay kit (Thermofisher scientific). Fifty ng of protein were separated by SDS-polyacrylamide gel electrophoresis (Bolt 4-12% Bis-Tris Plus gel) (Thermofisher scientific) and blotted on Trans-Blot Turbo nitrocellulose membranes (Bio-Rad). Membranes were blocked for 45 minutes with TBS-T containing 10% BSA or 5% non-fat dry milk, depending on the antibodies used. Afterward, membranes were incubated over-night at 4° C. with the following antibodies: anti-AKT (2972), anti-p44/42 MAPK (9102) anti-phosphoAKT Ser473 (9271), anti-phospho-p44/42 MAPK Thr202/Tyr204 (9101), anti-phosphoEGFR (3777), anti-phosphoMET (3077) (Cell Signaling Technology); anti-MET (DL21) homemade and anti-EGFR (1005 sc-03) (Santa Cruz). All the primary antibodies were diluted 1:1000. Appropriate HRP-conjugated secondary antibodies (1:10000-Jackson ImmunoResearch Laboratories, INC.) were used for detection with chemiluminescence using the Clarity Western ECL Substrate (Bio-Rad).

Cell Viability and Apoptosis Assay

Cell viability was evaluated using the Cell Titer Glow kit (Promega). Transfections were performed in a sixfold experiment with 25 nM of each Gapmers, in a 96 well plate in which 3000 cells/well were seeded. Luminescence was acquired after 24 hours from the transfection using the Tecan Spark 10M instrument (TECAN).

Apoptosis assay was carried out by cytofluorimeter using propidium iodide and Annexin V APC-conjugated (Thermofisher Scientific). Cells were transfected in 10 cm plates as described above. After 24 hours from transfection cells were detatched by trypsin, washed three times with PBS and incubated with Annexin V APC-conjugated and propidium iodide in binding buffer solution (0.5M Hepes, 0.15M NaCl, 0.005M CaCl2) using the Annexin V apoptosis detection kit APC (Thermofisher Scientific). Acquisition was performed on CyAn cytofluorometer (Beckman Coulter) using the Summit v4.3 software to analyse the data (Dako Colorado, INC.). Apoptotic index was expressed as the percentage of apoptotic cells and calculated using the formula: (n. early apoptotic cells+n. late apoptotic cells)/total detected cells.

Silencing of L1-Met

In Silico Characterization of the ASOs Targeting L1-MET

As mentioned above, a specific 76 bp region of L1-MET transcript encoded by the sequence GCAGAAAATGTGCTAGATTGGAGGTGAA-GACCCTGGAGCCAGAGAG CCTAGGCT-TAGTCCTAGCCCTGCACTGAAG (SEQ ID NO:1) was identified, and then the potentially more accessible part of it was detected. Considering all the trained algorithm, 2 'ASOs hot target' regions were revealed, located at the edges of the L1-MET specific region. Following the numbering reported above for SEQ ID NO:15, the 37% of the predicted antisense oligonucleotide were detected between the nucleotide +236 and +266, representing the first 31 bases of the specific region and the 36% of the predicted ASOs at the end of the same sequence (between nucleotide +289 and +311). Therefore, the detected 'ASOs hot target' regions are GCAGAAAATGTGCTAGATTGGAGGTGAAGAC (SEQ ID NO:2) and TTAGTCCTAGCCCTGCACTGAAG (SEQ ID NO:3).

Only 3 of the predicted ASOs covered the nucleotide position comprised between +267 and +288. To complete the ASOs evaluation, the tool sRNA of the web software sFOLD was applied to predict the secondary structure of the designed antisense oligos, in order to define their level of thermostability. It is known from literature that high rate self-folding ASOs can be considered as the less efficient, with an increase of target binding associated with reduced probability to form secondary structures. Thus, to define the efficacy of an ASO the Gibbs free energy ($\Delta G$) was calculated. The $\Delta G$ represented the energy released by folding a completely unfolded molecule. Lower level of $\Delta G$ are proper of potentially high rate self-folding molecules, whereas the less the nucleotides of a single ASOs produced hydrogen bonds, the less the ASOs were prone to develop secondary structures. In this context, a more stable antisense oligonucleotide (e.g. with positive values of $\Delta G$) can be considered as the most efficient. In literature, a cut-off of $\Delta G \leq -1.1$ was defined. Moreover, the heteroduplex formed by the ASO and the target mRNA depended also from the secondary folding of the transcript. The long size RNA molecules were always super-folded, and contrariwise to the small ASOs, regions with secondary structure are reported to be more accessible to hybridization, in particular when located at terminal end of the sequence. To check the L1-MET entire sequence folding, the sRNA algorithm in the sFOLD web page was interrogated. In Table 2 are reported all the 11 predicted ASOs targeting L1-MET with the related $\Delta G$ values.

TABLE 2

| ASO ID | Sequence 5'→3' | $\Delta G$ ASO | Base pair position on L1-MET |
|---|---|---|---|
| L1-MET_AS1 | GUCUUCACCUCCAAUC (SEQ ID NO: 4) | 2.5 | 251-266 |

TABLE 2-continued

| ASO ID | Sequence 5'→3' | ΔG ASO | Base pair position on L1-MET |
|---|---|---|---|
| L1-MET_AS2 | GCAGGGCUAGGACUAA (SEQ ID NO: 5) | 0.6 | 289-304 |
| L1-MET_AS3 | GCCUAGGCUCUCUGGC (SEQ ID NO: 6) | -2.7 | 273-288 |
| L1-MET_AS4 | CUAGCACAUUUUCUGC (SEQ ID NO: 7) | 0 | 236-251 |
| L1-MET_AS5 | CUCCAAUCUAGCACAU (SEQ ID NO: 8) | 3.4 | 243-258 |
| L1-MET_AS6 | ACCUCCAAUCUAGCAC (SEQ ID NO: 9) | 3.1 | 245-260 |
| L1-MET_AS7 | CUAGGCUCUCUGGCUC (SEQ ID NO: 10) | -1.8 | 271-286 |
| L1-MET_AS8 | CUAAGCCUAAGGCUCUC (SEQ ID NO: 11) | -2.7 | 277-292 |
| L1-MET_AS9 | GUGCAGGGCUAGGACU (SEQ ID NO: 12) | 1.1 | 291-306 |
| L1-MET_AS10 | AGUGCAGGGCUAGGAC (SEQ ID NO: 13) | 1.1 | 292-307 |
| L1-MET_AS11 | CUUCAGUGCAGGGCUA (SEQ ID NO: 14) | 0.2 | 296-311 |

In order to evaluate the effect of the L1-MET silencing, Exiqon was entrusted to design three different ASOs that cover the two hot region and also the nucleotide in the middle of the 76 bp region, predicted to be the less accessible; in detail, the L1-MET_AS1 (SEQ ID NO:4) complementary to the region between nucleotide+251 and nucleotide+266, the L1-MET_AS2 (SEQ ID NO:5), covering the sequence between +289 and +304. The third ASO (L1-MET_AS3 (SEQ ID NO:6)) overlapped the more central part of the sequence (between +273 and +288). FIG. 3 represents the secondary structure of the ASOs of the invention: beside two low folding molecules (L1-MET_AS1/2), the L1-MET_AS3 presented only the 37.5% of non-bounded bases, with a clear hairpin structure. As for the ΔG, the L1-MET_AS3 was confirmed as the most negative (ΔG=−2.7), with the L1-MET_AS2 with a ΔG=0.6. As for this feature, the L1-MET_AS1 was evaluated as the better designed ASOs (ΔG=2.5). In FIG. 4 are summarized the results of the investigation of the secondary structure of L1-MET. The first A panel showed the circular graph for the secondary structure: the L1-MET was composed by more than 5000 bp, so this graph stylized the secondary structure. The specific target sequence was comprised in the lower hemicycle of the chart, which is magnified in the FIG. 4B. More in detail, in the panel C the zoomed secondary structure of the 76 bp specific sequence is reported. The complementary part to the 3 designed ASOs were circled. All the target regions presented internal loops (L1-MET_AS1 and AS2) or hairpins (L1-MET_AS3), confirming the prediction results. However, L1-MET_AS1 and AS2 targeted the most favourable regions, characterized by secondary structures with free-extremities. In conclusion, taking all the previous data together, the L1-MET_AS3 was included independently from the ΔG, but with low potential activity.

As reported in Table 2, the ΔG was calculated for all the other predicted ASOs and despite there were other ASOs with a better ΔG, the three designed by Exiqon were used for the experiments herewith described, because they are generated using their own design tool. However, the efficiency of the other ASOs reported in this invention is not excluded.

Gene Expression Analysis

Figure 5:
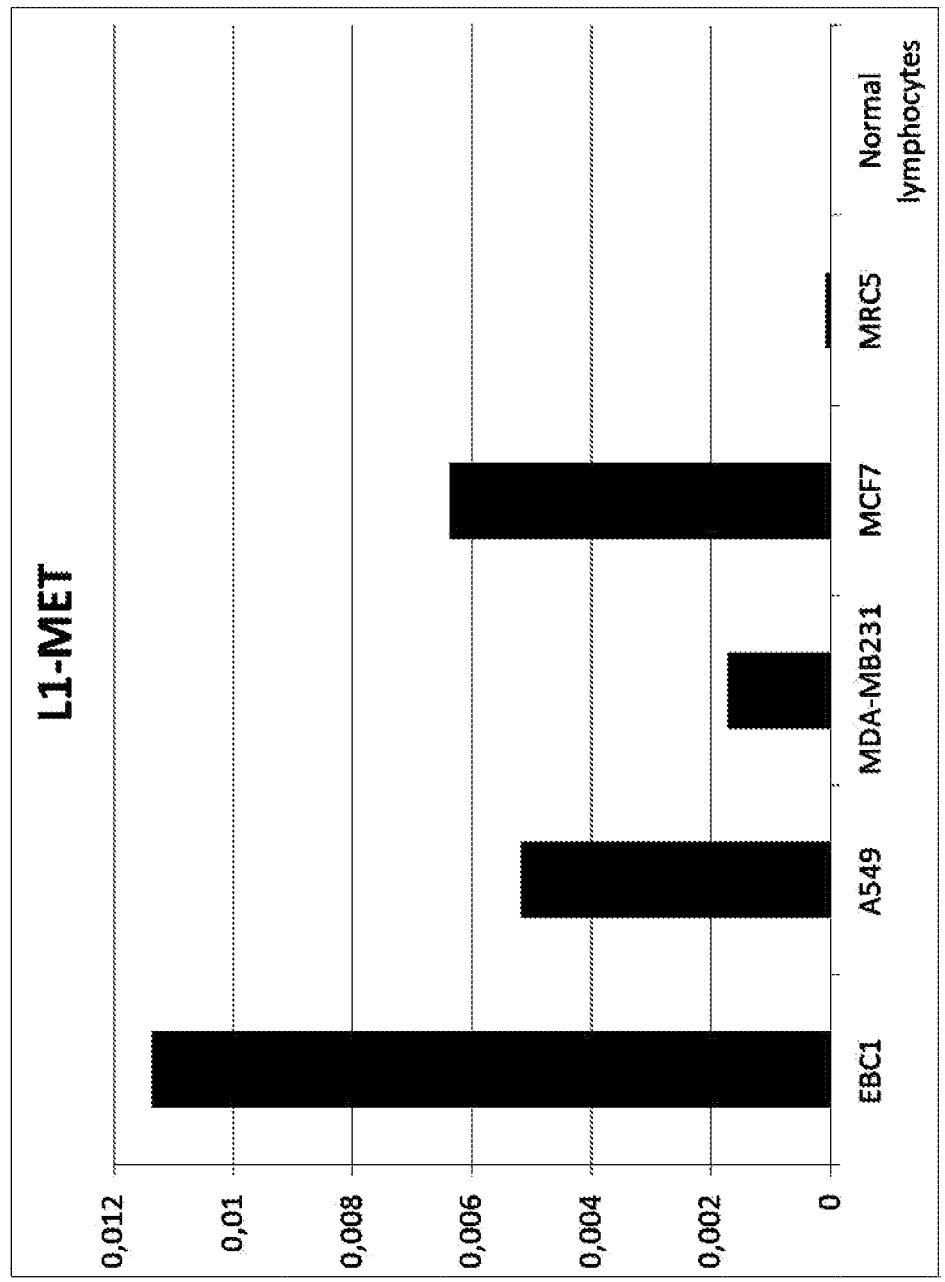
FIG. 5 shows the levels of L1-MET gene expression in the analyzed cell lines.
Figure 6:
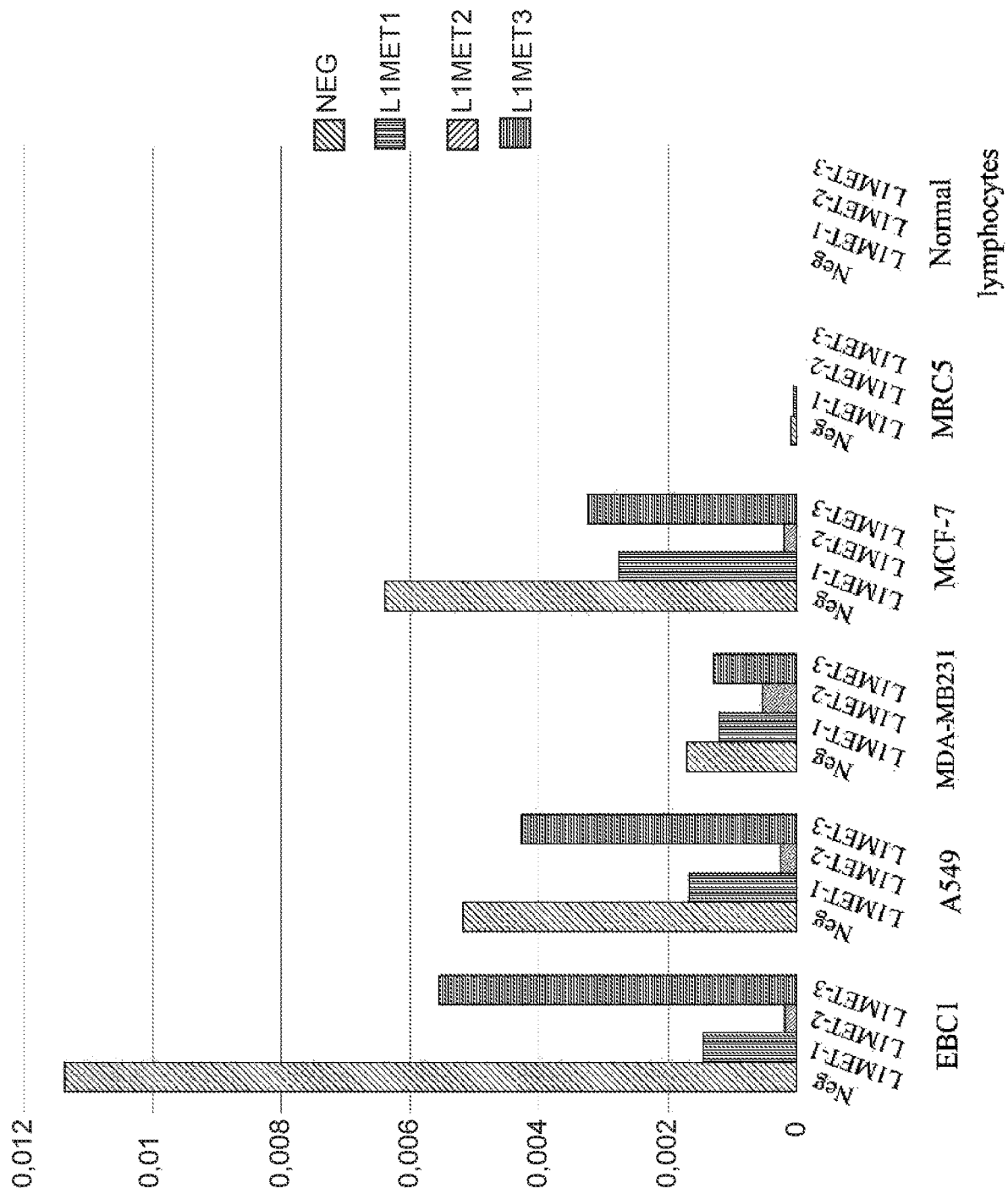
FIG. 6 shows the L1-MET gene expression analysis in the analysed cell lines after the silencing with L1-MET_AS1, L1-MET_AS2 and L1-MET_AS3.

The silencing of L1-MET was carried out transfecting cell lines with variable L1-MET and MET mRNA expression. Experiments were performed in lung cancer (EBC1, A549: L1-MET+/MET+) and breast cancer cells (MDA-MB231: L1-MET±/MET+; MCF7: L1-MET+/MET−). In addition, non transformed fibroblast cells, namely MRC5, and normal lymphocytes from peripheral blood, obtained from healthy donors, were also used as normal controls. The L1-MET expression was found to be normally high in EBC1, A549 and MCF7 and weak in MDA-MB231, whereas no transcription was detected in MRC5 and normal lymphocytes (FIG. 5). After 24 hours from transfection qRT-PCR showed a decreased gene expression of L1-MET in all the cancer cell lines but not in the normal cells (MRC5 and lymphocytes), confirming the efficacy of the silencing. As shown in FIG. 6, a decreasing silencing effect for the three Gapmers was observed, where L1-MET_AS2 was the most effective, followed by L1-MET_AS1. As predicted above, the L1-MET_AS3 was the less effective for silencing L1-MET transcript.

Cell Viability and Apoptosis Assay

Figure 7:
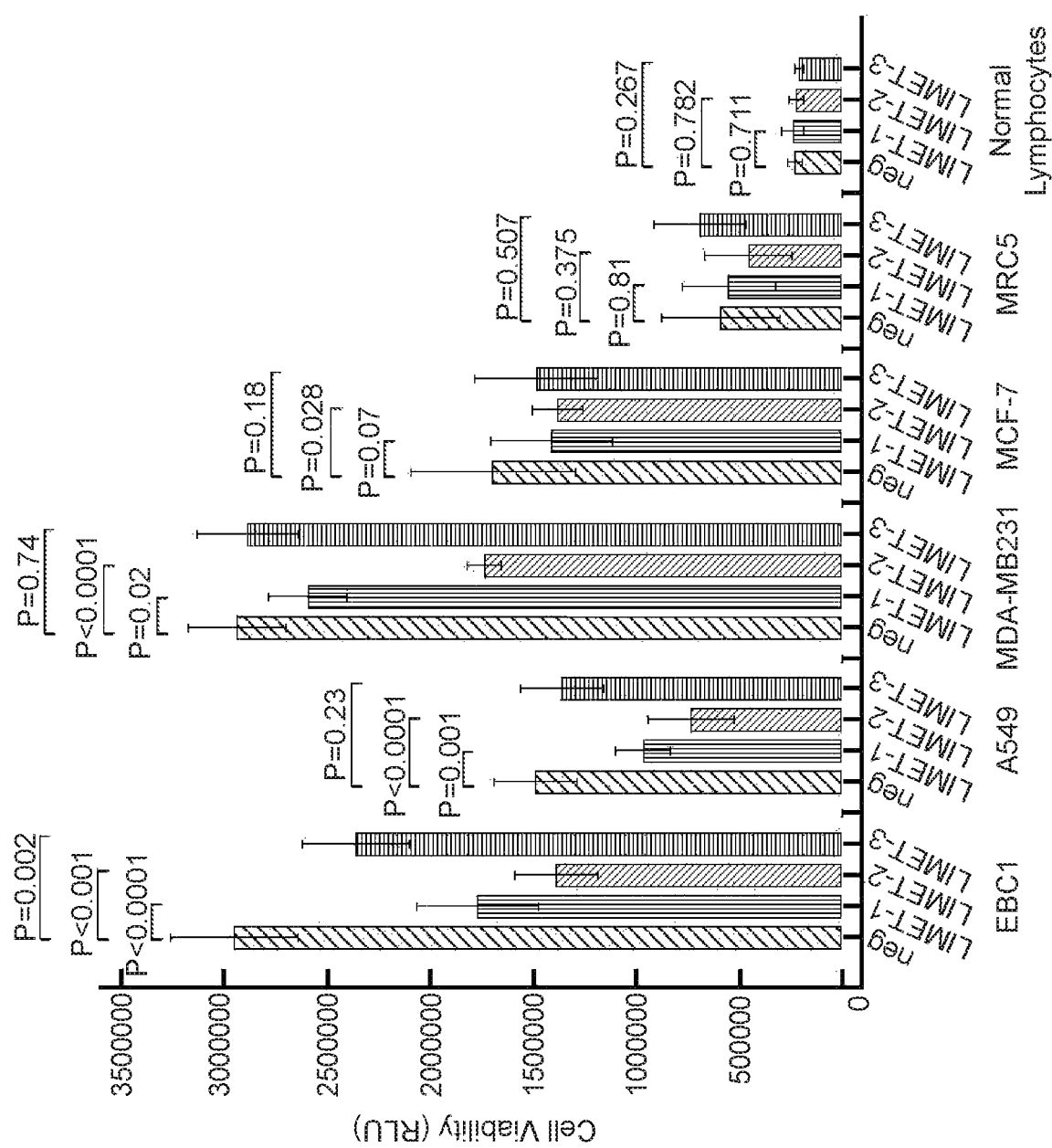
FIG. 7 shows the effect of L1-MET silencing on cell viability.
Figure 8:
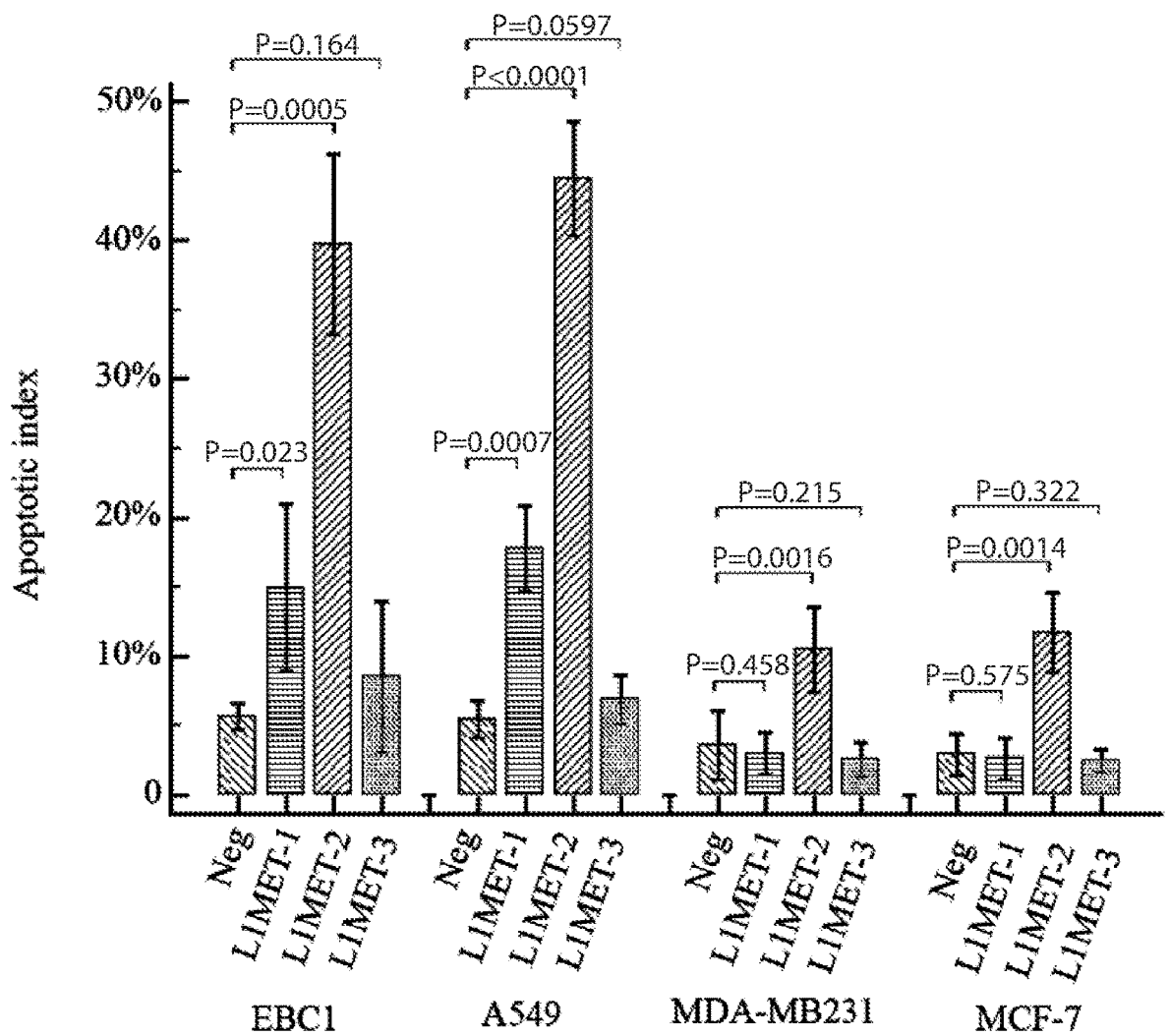
FIG. 8 shows the percentage of apoptotic cells after L1-MET silencing using L1-MET_AS1, L1-MET_AS2 and L1-MET_AS3 in cancer cell lines.

To investigate the biological effect of the L1-MET silencing, cell viability assay was performed. A strong reduction of viability was observed in EBC1 and A549 cell lines when treated with L1-MET_AS2 (p<0.0001) and L1-MET_AS1 (EBC1 p<0.0001 and A549 p=0.0001), whereas only EBC1 treated with L1-MET_AS3 showed a lower cell viability compare with the control (p=0.002) (FIG. 8). The L1-MET_AS2 had a significant effect on MDA-MB231 (p<0.0001) and on MCF7 (p=0.028). As expected, the control cells viability was not affected by the silencing with the three Gapmers (FIG. 7).

Finally, apoptosis evaluation performed on cancer cells, carried out using flow cytometry, revealed a remarkable cell death of EBC1 and A549 cells after the L1-MET silencing using L1-MET_AS1 or L1-MET_AS2 oligonucleotides. The silencing of L1-MET_AS2 was stronger than the one obtained with L1-MET_AS1_and was also detectable in MCF7 and MDA-MB231 cells. The silencing with L1-MET_AS3 did not show any effect on apoptosis (FIG. 8).

RNAseq Analysis

NGS analyses were performed on the cancer cells treated with L1-MET_AS1, without considering the other two ASOs due to their opposite and extreme genotypic and phenotypic effects. The RNA-seq mRNA Illumina kit was applied, implying the selection of the PolyA-tailed RNA of the above-mentioned cells treated with L1-MET_AS1, basing on the evidence revealed in the paper di Miglio et al., Int J Cancer, 2018 that also L1-MET retained the PolyA. It was decided to reach a 30 million-reads depth: a) to clearly confirm the L1-MET drop after the treatment; b) to evaluate gene expression modulation after the treatment, identifying the more interesting gene affected after the treatment; c) to perform off-target analyses on RNA-seq data. It was confirmed that the qRT-PCR detected L1-MET expression for all the cells. In the cell treated with the ASO, the same decrease of L1-MET was detected, confirming the efficacy of the silencing. As for the differential gene expression, a clear set of gene underwent to a specific modulating after 24 h from the treatment. Among them, EGFR and MET oncogene were reduced in all the treated cells, except for the MCF7. In this context, it become mandatory to evaluate possible off-targets sequence. Although in silico alignment using BLASTN tool identified only a few perfect-matchings, possible off-target, an empirical perfect-to-4 bases mismatch alignment between the L1-MET_AS1 and to the reads obtained in all the samples was set. This alignment procedure revealed the putative off-target genes, and the gene modulation was checked. Interestingly, none of the predicted off-targets suffered of a drop in the read count, confirming the absence of undesirable gene expression alteration. Indirectly, it was confirmed that both EGFR and MET gene modulation can be considered not a side effects of the silencing.

Western Blot Analysis

Figure 9:
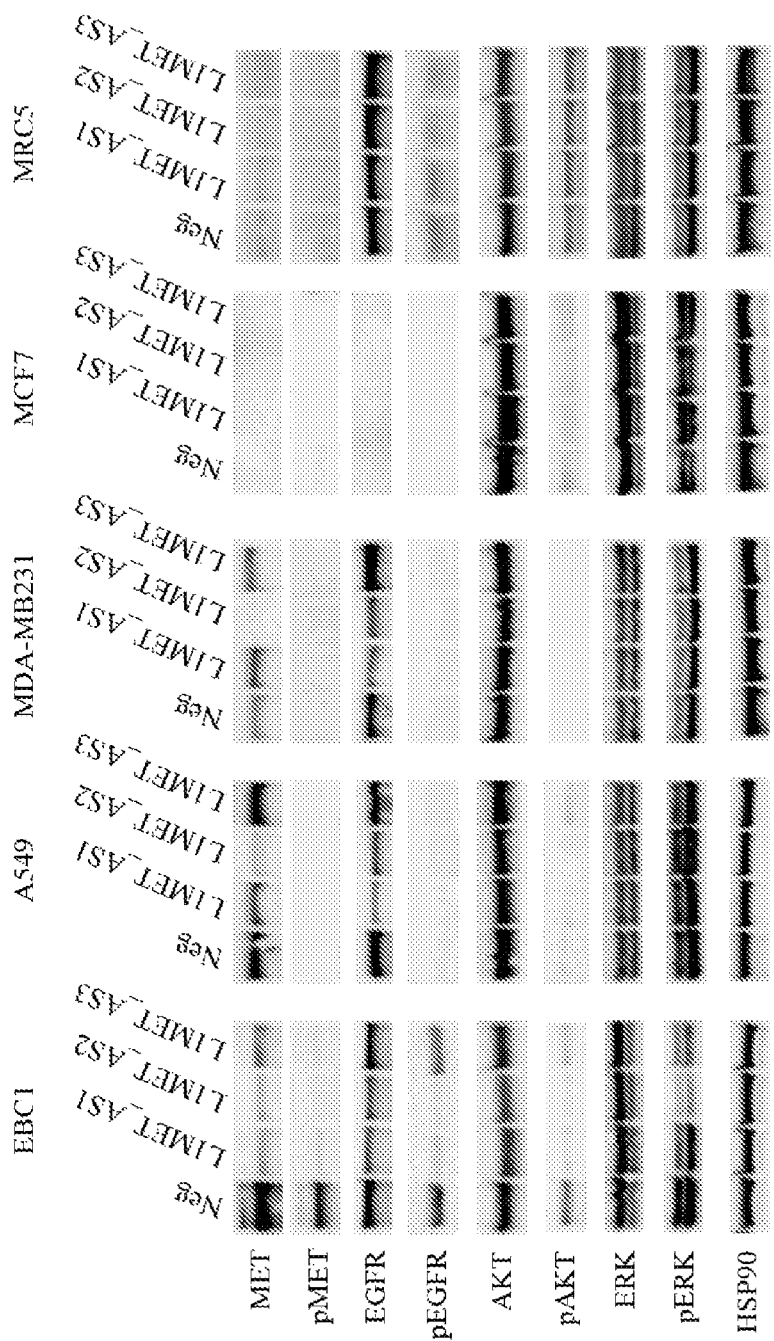
FIG. 9 shows the results of western blot analyses on L1-MET silenced cancer cells.

To validate the data obtained from RNAseq, the MET and EGFR protein expression and the downstream effectors of the signalling pathway were evaluated: AKT and ERK. Western blot analysis results are shown in FIG. 9. In summary, after L1-MET silencing in EBC1 cells, a decreased protein expression of both MET and EGFR and the corresponding phospho-protein was observed for all the three ASO with the same efficacy observed above, where the L1-MET_AS2 was the most effective followed by L1-MET_AS1 and L1-MET_AS3. EBC1 cell line is dependent from MET phosphorylation, therefore a reduction in AKT and ERK activation was also detected. Similar results were also found in A549 unless an alteration in ERK phosphorylation was not observed. In MDA-MB231 the L1-MET silencing induce the reduction of EGFR protein with both L1-MET_AS1 and L1-MET_AS2, but not using L1-MET_AS3. MET expression was seen to be reduced only when cells were treated with L1-MET_AS2. As reported in literature, MCF7 did not expressed neither MET not EGFR, and no changes were induced by the silencing. In the normal cells no difference in the protein expression was observed.

Overall, these results clearly show the efficacy of L1-MET silencing in those cells expressing L1-MET with MET and/or EGFR. Moreover, it was found that, the three antisense oligonucleotides were able to differently induce cell death. In detail, the most effective results were obtained by L1-MET_AS2, followed by L1-MET_AS1 and L1-MET_AS3. These evidences indicate the possibility to translate L1-MET silencing to in vivo model in order to develop a selective treatment for human cancers.

REFERENCES

1. Beck, C. R., et al., LINE-1 retrotransposition activity in human genomes. Cell, 2010. 141(7): p. 1159-70.
2. Brouha, B., et al., Hot L1s account for the bulk of retrotransposition in the human population. Proc Natl Acad Sci USA, 2003. 100(9): p. 5280-5.
3. Swergold, G. D., Identification, characterization, and cell specificity of a human LINE-1 promoter. Mol Cell Biol, 1990. 10(12): p. 6718-29.
4. Speek, M., Antisense promoter of human L1 retrotransposon drives transcription of adjacent cellular genes. Mol Cell Biol, 2001. 21(6): p. 1973-85.
5. Denli, A. M., et al., Primate-specific ORF0 contributes to retrotransposon-mediated diversity. Cell, 2015. 163(3): p. 583-93.
6. Nigumann, P., K. Redik, K. Matlik, and M. Speek, Many human genes are transcribed from the antisense promoter of L1 retrotransposon. Genomics, 2002. 79(5): p. 628-34.
7. Miglio, U., et al., The expression of LINE1-MET chimeric transcript identifies a subgroup of aggressive breast cancers. Int J Cancer, 2018. 143(11): p. 2838-2848.
8. Weber, B., S. Kimhi, G. Howard, A. Eden, and F. Lyko, Demethylation of a LINE-1 antisense promoter in the cMet locus impairs Met signalling through induction of illegitimate transcription. Oncogene, 2010. 29(43): p. 5775-84.
9. Wolff, E. M., et al., Hypomethylation of a LINE-1 promoter activates an alternate transcript of the MET oncogene in bladders with cancer. PLOS Genet, 2010. 6(4): p. e1000917.
10. Crooke, S. T., Molecular Mechanisms of Antisense Oligonucleotides. Nucleic Acid Ther, 2017. 27(2): p. 70-77.
11. Shen, X. and D. R. Corey, Chemistry, mechanism and clinical status of antisense oligonucleotides and duplex RNAs. Nucleic Acids Res, 2018. 46(4): p. 1584-1600.
12. Di Fusco, D., et al., Antisense Oligonucleotide: Basic Concepts and Therapeutic Application in Inflammatory Bowel Disease. Front Pharmacol, 2019. 10: p. 305.
13. Bo, X., et al., Selection of antisense oligonucleotides based on multiple predicted target mRNA structures. BMC Bioinformatics, 2006. 7: p. 122.
14. Shao, Y., Y. Wu, C. Y. Chan, K. McDonough, and Y. Ding, Rational design and rapid screening of antisense oligonucleotides for prokaryotic gene modulation. Nucleic Acids Res, 2006. 34(19): p. 5660-9.
15. Frankish, A., et al., GENCODE reference annotation for the human and mouse genomes. Nucleic Acids Res, 2019. 47(D1): p. D766-D773.
16. Dobin, A., et al., STAR: ultrafast universal RNA-seq aligner. Bioinformatics, 2013. 29(1): p. 15-21.
17. Liao, Y., G. K. Smyth, and W. Shi, featureCounts: an efficient general purpose program for assigning sequence reads to genomic features. Bioinformatics, 2014. 30(7): p. 923-30.

What is claimed is:

1. A modified antisense oligonucleotide targeting a region of an L1-MET transcript encoded by SEQ ID NO:1, wherein the modified antisense oligonucleotide comprises or consists of any one of SEQ ID NO: 4, SEQ ID NO: 5, or SEQ ID NO: 6.

2. The modified antisense oligonucleotide according to claim 1, wherein the modified antisense oligonucleotide comprises ribonucleotides, a combination of ribonucleotides and deoxyribonucleotides, and/or nucleotides with modified ribose and/or deoxyribose.

3. A pharmaceutical composition comprising one or more antisense nucleotides according to claim 1, as an active principle, in association with one or more excipients and/or adjuvants.

4. The pharmaceutical composition according to claim 3, said pharmaceutical composition further comprising one or more anticancer drugs.

5. A method of treating a L1-MET expressing tumor in a patient in need thereof, the method comprising administering a modified antisense oligonucleotide to the patient, wherein the modified antisense oligonucleotide is an antisense oligonucleotide according to claim 1.

6. A method of treating a L1-MET expressing tumor in a patient, the method comprising administering a pharmaceutical composition to the patient, wherein the pharmaceutical composition is a pharmaceutical according to claim 3.

7. The method of claim 5, wherein the L1-MET expressing tumor is a triple-negative breast cancer, lung adenocarcinoma, or colorectal cancer.

8. A method of treating a L1-MET expressing tumor in a patient, the method comprising administering a combination of one or more modified antisense oligonucleotides with one or more anticancer drugs to the patient, wherein the modified antisense oligonucleotide is an antisense oligonucleotide according to claim 1.

9. The method of claim 8, wherein the combination of one or more modified antisense oligonucleotides with one or more anticancer drugs are administered to the patient separately.

10. The method of claim 8, wherein the combination of one or more modified antisense oligonucleotides with one or more anticancer drugs are administered to the patient sequentially.

\* \* \* \* \*

SEQUENCE LISTING

```
<160> NUMBER OF SEQ ID NOS: 17

<210> SEQ ID NO 1
<211> LENGTH: 76
<212> TYPE: DNA
<213> ORGANISM: Homo sapiens

<400> SEQUENCE: 1
```

```
gcagaaaatg tgctagattg gaggtgaaga ccctggagcc agagagccta ggcttagtcc    60
tagccctgca ctgaag                                                   76

<210> SEQ ID NO 2
<211> LENGTH: 31
<212> TYPE: DNA
<213> ORGANISM: Homo sapiens

<400> SEQUENCE: 2
gcagaaaatg tgctagattg gaggtgaaga c                                  31

<210> SEQ ID NO 3
<211> LENGTH: 23
<212> TYPE: DNA
<213> ORGANISM: Homo sapiens

<400> SEQUENCE: 3
ttagtcctag ccctgcactg aag                                           23

<210> SEQ ID NO 4
<211> LENGTH: 16
<212> TYPE: RNA
<213> ORGANISM: Artificial Sequence
<220> FEATURE:
<223> OTHER INFORMATION: antisense oligonucleotide targeting L1-MET
      transcript

<400> SEQUENCE: 4
gucuucaccu ccaauc                                                   16

<210> SEQ ID NO 5
<211> LENGTH: 16
<212> TYPE: RNA
<213> ORGANISM: Artificial Sequence
<220> FEATURE:
<223> OTHER INFORMATION: antisense oligonucleotide targeting L1-MET
      transcript

<400> SEQUENCE: 5
gcagggcuag gacuaa                                                   16

<210> SEQ ID NO 6
<211> LENGTH: 16
<212> TYPE: RNA
<213> ORGANISM: Artificial Sequence
<220> FEATURE:
<223> OTHER INFORMATION: antisense oligonucleotide targeting L1-MET
      transcript

<400> SEQUENCE: 6
gccuaggcuc ucuggc                                                   16

<210> SEQ ID NO 7
<211> LENGTH: 16
<212> TYPE: RNA
<213> ORGANISM: Artificial Sequence
<220> FEATURE:
<223> OTHER INFORMATION: antisense oligonucleotide targeting L1-MET
      transcript

<400> SEQUENCE: 7
cuagcacauu uucugc                                                   16

<210> SEQ ID NO 8
<211> LENGTH: 16
```

```
<212> TYPE: RNA
<213> ORGANISM: Artificial Sequence
<220> FEATURE:
<223> OTHER INFORMATION: antisense oligonucleotide targeting L1-MET
      transcript

<400> SEQUENCE: 8
cuccaaucua gcacau                                                   16

<210> SEQ ID NO 9
<211> LENGTH: 16
<212> TYPE: RNA
<213> ORGANISM: Artificial Sequence
<220> FEATURE:
<223> OTHER INFORMATION: antisense oligonucleotide targeting L1-MET
      transcript

<400> SEQUENCE: 9
accuccaauc uagcac                                                   16

<210> SEQ ID NO 10
<211> LENGTH: 16
<212> TYPE: RNA
<213> ORGANISM: Artificial Sequence
<220> FEATURE:
<223> OTHER INFORMATION: antisense oligonucleotide targeting L1-MET
      transcript

<400> SEQUENCE: 10
cuaggcucuc uggcuc                                                   16

<210> SEQ ID NO 11
<211> LENGTH: 17
<212> TYPE: RNA
<213> ORGANISM: Artificial Sequence
<220> FEATURE:
<223> OTHER INFORMATION: antisense oligonucleotide targeting L1-MET
      transcript

<400> SEQUENCE: 11
cuaagccuaa ggcucuc                                                  17

<210> SEQ ID NO 12
<211> LENGTH: 16
<212> TYPE: RNA
<213> ORGANISM: Artificial Sequence
<220> FEATURE:
<223> OTHER INFORMATION: antisense oligonucleotide targeting L1-MET
      transcript

<400> SEQUENCE: 12
gugcagggcu aggacu                                                   16

<210> SEQ ID NO 13
<211> LENGTH: 16
<212> TYPE: RNA
<213> ORGANISM: Artificial Sequence
<220> FEATURE:
<223> OTHER INFORMATION: antisense oligonucleotide targeting L1-MET
      transcript

<400> SEQUENCE: 13
agugcagggc uaggac                                                   16

<210> SEQ ID NO 14
<211> LENGTH: 16
<212> TYPE: RNA
```

```
<213> ORGANISM: Artificial Sequence
<220> FEATURE:
<223> OTHER INFORMATION: antisense oligonucleotide targeting L1-MET
      transcript

<400> SEQUENCE: 14
cuucagugca gggcua                                                    16

<210> SEQ ID NO 15
<211> LENGTH: 5546
<212> TYPE: DNA
<213> ORGANISM: Homo sapiens

<400> SEQUENCE: 15 cttttttgttt gtctgtgccc tgccccgaga ggtggagcct acagaggcag gcaggcctcc    60
ttgagctctg gtgggctcca cccagttcta gcttccaggc tgctttgttt acctaagcaa   120
gcctgggcaa tggcgggtgc ccctccccca gcctcgctgc cgccttgcgg tttgatctca   180
gactgctgtg ctagcaatca gcgggactcc gtgggcgtag gaccctccga gccaggcaga   240
aaatgtgcta gattggaggt gaagaccctg gagccagaga gcctaggctt agtcctagcc   300
ctgcactgaa gacacttctg agaaattcat caggctgtga agcgcgccgt gatgaatatc   360
gaacagagtt taccacagct ttgcagcgcg ttgacttatt catgggtcaa ttcagcgaag   420
tcctcttaac atctatatcc accttcatta aaggagacct caccatagct aatcttggga   480
catcagaggg tcgcttcatg caggttgtgg tttctcgatc aggaccatca acccctcatg   540
tgaattttct cctggactcc catccagtgt ctccagaagt gattgtggag catacattaa   600
accaaaatgg ctacacactg gttatcactg gaagaagat cacgaagatc ccattgaatg   660
gcttgggctg cagacatttc cagtcctgca gtcaatgcct ctctgcccca ccctttgttc   720
agtgtggctg gtgccacgac aaatgtgtgc gatcggagga atgcctgagc gggacatgga   780
ctcaacagat ctgtctgcct gcaatctaca aggttttccc aaatagtgca cccccttgaag  840 gagggacaag gctgaccata tgtggctggg actttggatt tcggaggaat aataaatttg   900
atttaaagaa aactagagtt ctccttggaa atgagagctg caccttgact ttaagtgaga   960
gcacgatgaa tacattgaaa tgcacagttg gtcctgccat gaataagcat ttcaatatgt  1020
ccataattat ttcaaatggc cacgggacaa cacaatacag tacattctcc tatgtggatc  1080
ctgtaataac aagtatttcg ccgaaatacg gtcctatggc tggtggcact ttacttactt  1140
taactggaaa ttacctaaac agtgggaatt ctagacacat ttcaattggt ggaaaaacat  1200
gtactttaaa aagtgtgtca aacagtattc ttgaatgtta taccccagcc caaaccattt  1260
caactgagtt tgctgttaaa ttgaaaattg acttagccaa ccgagagaca agcatcttca  1320
gttaccgtga agatcccatt gtctatgaaa ttcatccaac caaatctttt attagtggtg  1380
ggagcacaat aacaggtgtt gggaaaaacc tgaattcagt tagtgtcccg agaatggtca  1440
taaatgtgca tgaagcagga aggaacttta cagtggcatg tcaacatcgc tctaattcag  1500
agataatctg ttgtaccact ccttccctgc aacagctgaa tctgcaactc ccctgaaaa  1560 ccaaagcctt tttcatgtta gatgggatcc tttccaaata ctttgatctc atttatgtac  1620
ataatcctgt gtttaagcct tttgaaaagc cagtgatgat ctcaatgggc aatgaaaatg  1680
tactggaaat taagggaaat gatattgacc ctgaagcagt taaaggtgaa gtgttaaaag  1740
ttggaaataa gagctgtgag aatatacact tacattctga gccgttttta tgcacggtcc  1800
ccaatgacct gctgaaattg aacagcgagc taaatataga gtggaagcaa gcaatttctt  1860
```

-continued

```
caaccgtcct tggaaaagta atagttcaac cagatcagaa tttcacagga ttgattgctg    1920
gtgttgtctc aatatcaaca gcactgttat tactacttgg gttttcctg tggctgaaaa     1980
agagaaagca aattaaagat ctgggcagtg aattagttcg ctacgatgca agagtacaca    2040
ctcctcattt ggataggctt gtaagtgccc gaagtgtaag cccaactaca gaaatggttt    2100
caaatgaatc tgtagactac cgagctactt ttccagaaga tcagtttcct aattcatctc    2160
agaacggttc atgccgacaa gtgcagtatc ctctgacaga catgtccccc atcctaacta    2220
gtggggactc tgatatatcc agtccattac tgcaaaatac tgtccacatt gacctcagtg    2280
ctctaaatcc agagctggtc caggcagtgc agcatgtagt gattgggccc agtagcctga    2340
ttgtgcattt caatgaagtc ataggaagag ggcattttgg ttgtgtatat catgggactt    2400
tgttggacaa tgatggcaag aaaattcact gtgctgtgaa atccttgaac agaatcactg    2460
acataggaga agtttcccaa tttctgaccg agggaatcat catgaaagat tttagtcatc    2520
ccaatgtcct ctcgctcctg ggaatctgcc tgcgaagtga agggtctccg ctggtggtcc    2580
taccatacat gaaacatgga gatcttcgaa atttcattcg aaatgagact cataatccaa    2640
ctgtaaaaga tcttattggc tttggtcttc aagtagccaa aggcatgaaa tatcttgcaa    2700
gcaaaaagtt tgtccacaga gacttggctg caagaaactg tatgctggat gaaaaattca    2760
cagtcaaggt tgctgatttt ggtcttgcca gagacatgta tgataaagaa tactatagtg    2820
tacacaacaa aacaggtgca aagctgccag tgaagtggat ggctttggaa agtctgcaaa    2880
ctcaaaagtt taccaccaag tcagatgtgt ggtcctttgg cgtgctcctc tgggagctga    2940
tgacaagagc agccccacct tatcctgacg taaacacctt tgatataact gtttacttgt    3000
tgcaagggag aagactccta caacccgaat actgcccaga ccccttatat gaagtaatgc    3060
taaaatgctg gcaccctaaa gccgaaatgc gcccatcctt ttctgaactg gtgtcccgga    3120
tatcagcgat cttctctact ttcattgggg agcactatgt ccatgtgaac gctacttatg    3180
tgaacgtaaa atgtgtcgct ccgtatcctt ctctgttgtc atcagaagat aacgctgatg    3240
atgaggtgga cacacgacca gcctccttct gggagacatc atagtgctag tactatgtca    3300
aagcaacagt ccacactttg tccaatggtt ttttcactgc ctgacctta aaaggccatc     3360
gatattcttt gctcttgcca aaattgcact attataggac ttgtattgtt atttaaatta    3420
ctggattcta aggaatttct tatctgacag agcatcagaa ccagaggctt ggtcccacag    3480
gccacggacc aatggcctgc agccgtgaca acactcctgt catattggag tccaaaactt    3540
gaattctggg ttgaattttt taaaaatcag gtaccacttg atttcatatg ggaaattgaa    3600
gcaggaaata ttgagggctt cttgatcaca gaaaactcag aagagatagt aatgctcagg    3660
acaggagcgg cagcccccaga acaggccact catttagaat tctagtgttt caaaacactt    3720
ttgtgtgttg tatggtcaat aacatttttc attactgatg gtgtcattca cccattaggt    3780
aaacattccc ttttaaatgt ttgtttgttt tttgagacag atctcactc tgttgccagg      3840
gctgtagtgc agtggtgtga tcatagctca ctgcaacctc cacctcccag gctcaagcct    3900
cccgaatagc tgggactaca ggcgcacacc accatccccg gctaatttt gtatttttg      3960
tagagacggg ttttgccat gttgccaagg ctggtttcaa actcctggac tcaagaaatc     4020
cacccacctc agcctcccaa agtgctagga ttacaggcat gagccactgc gcccagccct    4080
tataaatttt tgtatagaca ttcctttggt tggaagaata tttataggca atacagtcaa    4140
agtttcaaaa tagcatcaca caaaacatgt ttataaatga acaggatgta atgtacatag    4200
atgacattaa gaaaatttgt atgaaataat ttagtcatca tgaaatattt agttgtcata    4260
```

```
taaaaaccca ctgtttgaga atgatgctac tctgatctaa tgaatgtgaa catgtagatg      4320
ttttgtgtgt atttttttaa atgaaaactc aaaataagac aagtaatttg ttgataaata      4380
tttttaaaga taactcagca tgtttgtaaa gcaggataca ttttactaaa aggttcattg      4440
gttccaatca cagctcatag gtagagcaaa gaaagggtgg atggattgaa aagattagcc      4500
tctgtctcgg tggcaggttc ccacctcgca agcaattgga acaaaacttt tggggagtt       4560 ttattttgca ttagggtgtg ttttatgtta agcaaaacat actttagaaa caaatgaaaa      4620
aggcaattga aaatcccagc tatttcacct agatggaata gccaccctga gcagaacttt      4680
gtgatgcttc attctgtgga attttgtgct tgctactgta tagtgcatgt ggtgtaggtt      4740
actctaactg gttttgtcga cgtaaacatt taaagtgtta tatttttat aaaaatgttt       4800 attttaatg atatgagaaa aattttgtta ggccacaaaa acactgcact gtgaacattt       4860
tagaaaaggt atgtcagact gggattaatg acagcatgat tttcaatgac tgtaaattgc      4920
gataaggaaa tgtactgatt gccaatacac cccacccctca ttacatcatc aggacttgaa      4980
gccaagggtt aacccagcaa gctacaaaga gggtgtgtca cactgaaact caatagttga      5040
gtttggctgt tgttgcagga aaatgattat aactaaaagc tctctgatag tgcagagact      5100
taccagaaga cacaaggaat tgtactgaag agctattaca atccaaatat tgccgtttca      5160 taatgtaat aagtaatact aattcacaga gtattgtaaa tggtggatga caaaagaaaa       5220
tctgctctgt ggaaagaaag aactgtctct accagggtca agagcatgaa cgcatcaata      5280
gaaagaactc ggggaaacat cccatcaaca ggactacaca cttgtatata cattcttgag      5340
aacactgcaa tgtgaaaatc acgtttgcta tttataaact tgtccttaga ttaatgtgtc      5400
tggacagatt gtgggagtaa gtgattcttc taagaattag atacttgtca ctgcctatac      5460
ctgcagctga actgaatggt acttcgtatg ttaatagttg ttctgataaa tcatgcaatt      5520
aaagtaaagt gatgcaacat cttgta                                          5546
```

<210> SEQ ID NO 16
<211> LENGTH: 420
<212> TYPE: DNA
<213> ORGANISM: Homo sapiens

<400> SEQUENCE: 16

```
cttttttgttt gtctgtgccc tgccccgaga ggtggagcct acagaggcag gcaggcctcc      60
ttgagctctg gtgggctcca cccagttcta gcttccaggc tgctttgttt acctaagcaa     120
gcctgggcaa tggcgggtgc ccctccccca gcctcgctgc cgccttgcgg tttgatctca     180
gactgctgtg ctagcaatca gcgggactcc gtgggcgtag gaccctccga gccaggcaga     240
aaatgtgcta gattggaggt gaagaccctg gagccagaga gcctaggctt agtcctagcc     300
ctgcactgaa gacacttctg agaaattcat caggctgtga agcgcgccgt gatgaatatc     360
gaacagagtt taccacagct ttgcagcgcg ttgacttatt catgggtcaa ttcagcgaag     420
```

<210> SEQ ID NO 17
<211> LENGTH: 5546
<212> TYPE: RNA
<213> ORGANISM: Homo sapiens

<400> SEQUENCE: 17

```
cuuuuuguuu gucugugccc ugccccgaga gguggagccu acagaggcag gcaggccucc      60
uugagcucug gugggcucca cccaguucua gcuuccaggc ugcuuuguuu accuaagcaa     120
```

| | |
|---|---|
| gccugggcaa uggcggugc cccucccca gccucgcugc cgccuugcgg uuugaucuca | 180 |
| gacugcugug cuagcaauca gcgggacucc gugggcguag gacccuccga gccaggcaga | 240 |
| aaaugugcua gauuggaggu gaagacccug gagccagaga gccuaggcuu aguccuagcc | 300 |
| cugcacugaa gacacuucug agaaauucau caggcuguga agcgcgccgu gaugaauauc | 360 |
| gaacagaguu uaccacagcu uugcagcgcg uugacuuauu caugggucaa uucagcgaag | 420 |
| uccucuuaac aucuauaucc accuucauua aaggagaccu caccauagcu aaucuuggga | 480 |
| caucagaggg ucgcuucaug cagguugugg uuucucgauc aggaccauca accccucaug | 540 |
| ugaauuuucu ccuggacucc cauccagugu uccagaagu gauuguggag cauacauuaa | 600 |
| accaaaaugg cuacacacug guuaucacug gaagaagau cacgaagauc ccauugaaug | 660 |
| gcuugggcug cagacauuuc cagccugca gucaaugccu cucugcccca cccuuuguuc | 720 |
| agugguggcug ugccacgac aaaugugugc gaucggagga augccugagc gggacaugga | 780 |
| cucaacagau cugucugccu gcaaucuaca agguuuuccc aaauagugca ccccuugaag | 840 |
| gagggacaag gcugaccaua uguggcuggg acuuuggauu ucggaggaau aauaaauuug | 900 |
| auuuaaagaa aacuagaguu ucccuuggaa augagagcug caccuugacu uuaagugaga | 960 |
| gcacgaugaa uacauugaaa ugcacaguug guccugccau gaauaagcau ucaauaugu | 1020 |
| ccauaauuau uucaaauggc cacgggacaa cacaauacag uacauucucc uaugugggauc | 1080 |
| cuguaauaac aaguauuucg ccgaaauacg guccuauggc ugguggcacu uuacuuacuu | 1140 |
| uaacuggaaa uuaccuaaac aguggggaauu cuagacacau uucaauuggu ggaaaaacau | 1200 |
| guacuuuaaa aagugugcuca aacaguauuc uugaauguua uccccagcc caaaccauuu | 1260 |
| caacugaguu ugcuguuaaa uugaaaauug acuuuagccaa ccgagagaca agcaucuuca | 1320 |
| guuaccguga agaucccauu gucuaugaaa uucauccaac caaaucuuuu auuaguggug | 1380 |
| ggagcacaau aacagguguu gggaaaaacc ugaauucagu uagugucccg agaaugguca | 1440 |
| uaaaugugca ugaagcagga aggaacuuua caguggcaug ucaacaucgc ucuaauucag | 1500 |
| agauaaucug uuguaccacu ccuucccugc aacagcugaa ucugcaacuc ccccugaaaa | 1560 |
| ccaaagccuu uuucauguua gaugggaucc uuuccaaaua cuuugaucuc auuuauguac | 1620 |
| auaauccugu guuuaagccu uuugaaaagc cagugaugau cucaauggggc aaugaaaaug | 1680 |
| uacuggaaau uaagggaaau gauauugacc cugaagcagu uaaaggugaa uguuaaaag | 1740 |
| uuggaaauaa gagcugugag aauauacacu uacauucuga agccguuuua ugcacggucc | 1800 |
| ccaaugaccu gcugaaauug aacagcagc uaaauauaga guggaagcaa gcaauuucuu | 1860 |
| caaccgtccu uggaaaagua auaguucaac cagaucagaa uuucacagga uugauugcug | 1920 |
| guguugcuc aauaucaaca gcacuguauu acuacuugg guuuuccug uggcugaaaa | 1980 |
| agagaaagca aauuaaagau cugggcagug aauuaguucg cuacgaugca agaguacaca | 2040 |
| cucccucauuu ggauaggcuu guaagugccc gaaguguaag cccaacuaca gaaaugguuu | 2100 |
| caaaugaauc uguagacuac cgagcuacuu uccagaagau cagguuuccu aauucaucuc | 2160 |
| agaacgguuc augccgacaa gugcaguauc ucugacaga caugucccc auccuaacua | 2220 |
| gugggggacuc ugauauaucc agccauuac ugcaaaauac ugccacauu gaccucagug | 2280 |
| cucuaaaucc agagcuggu caggcagugc agcauguagu gauggggccc aguagccuga | 2340 |
| uugugcauuu caaugaaguc auaggaagag ggcauuuugg uuguguauau caugggacuu | 2400 |
| uguuggacaa ugauggcaag aaaauucacu gucugugaa auccuugaac agaaucacug | 2460 |
| acauaggaga aguucccaa uuucugaccg agggaaucau caugaaagau uuuagucauc | 2520 |

-continued

```
ccaauguccu cucgcuccug ggaaucugcc ugcgaaguga agggucuccg cuggugguuc    2580
uaccauacau gaaacaugga gaucuucgaa auuucauucg aaaugagacu cauaauccaa    2640
cuguaaaaga ucuuauuggc uuuggucuuc aaguagccaa aggcaugaaa uaucuugcaa    2700
gcaaaaaguu uguccacaga gacuuggcug caagaaacug uaugcuggau gaaaaauuca    2760
cagucaaggu ugcugauuuu ggucuugcca gagacaugua ugauaaagaa uacuauagug    2820
uacacaacaa aacaggugca aagcugccag ugaaguggau ggcuuuggaa agucugcaaa    2880
cucaaaaguu uaccaccaag ucagaugugu gguccuuugg cgugcuccuc ugggagcuga    2940
ugacaagagg agccccaccu uauccugacg uaaacaccuu ugauauaacu guuuacuugu    3000
ugcaagggag aagacuccua caacccgaau acugcccaga ccccuuauau gaaguaaugc    3060
uaaaaugcug gcacccuaaa gccgaaaugc gcccauccuu uucugaacug gugucccgga    3120
uaucagcgau cuucucuacu uucauggggg agcacuaugu ccaugugaac gcuacuuaug    3180
ugaacguaaa augugucgcu ccguauccuu cucguugguc aucagaagau aacgcugaug    3240
augaggugga cacacgacca gccuccuucu gggagacauc auagugcuag uacuaugaca    3300
aagcaacagu ccacacuuug uccaauggu uuuucacugc cugaccuuua aaaggccauc    3360
gauauucuuu gcucuugcca aaauugcacu auuauaggac uuguauuguu auuuaaauua    3420
cuggauucua aggaauuucu uaucugacag agcaucagaa ccagaggcuu ggucccacag    3480
gccacggacc aauggccugc agccgugaca acacuccugu cauauuggag uccaaaacuu    3540
gaauucuggg uugaauuuuu uaaaaaucag guaccacuug auuucauaug ggaaauugaa    3600
gcaggaaaua uugagggcuu cuugaucaca gaaaacucag aagagauagu aaugcucagg    3660
acaggagcgg cagccccaga acaggccacu cauuuagaau ucuaguguuu caaaacacuu    3720
uuguguguug uauggucaau aacauuuuuc auuacugaug gugucauuca cccauuaggu    3780
aaacauuccc uuuuaaaugu uuguuuguuu uuugagacag gaucucacuc uguugccagg    3840
gcuguagugc aguggugugu cauagcuca cugcaaccuc caccucccag cucaagccu    3900 cccgaauagc ugggacuaca ggcgcacacc accauccccg gcuaauuuuu guauuuuuug    3960
uagagacggg guuugccau guugcccaagg cugguuucaa acuccggac ucaagaaauc    4020 caccacccuc agccucccaa agugcuagga uuacaggcau gagccacugc gcccagcccu    4080
uauaaauuuu uguauagaca uuccuuuggu uggaagaaua uuuauaggca auacagucaa    4140
aguuucaaaa uagcaucaca caaaacaugu uuauaaauga acaggaugua auguacauag    4200
augacauuaa gaaauuuugu augaaauauu uuagucauca ugaauauuuu aguugcauua    4260 uaaaaccca cuguuugaga augaugcuac ucugaucuaa ugaaugugaa caugagaug    4320 uuuugugugu auuuuuuaa augaaaacuc aaaauaagac aaguaauuug uugauaaaua    4380
uuuuuaaaga uaacucagca uguuuguaaa gcaggauaca uuuuacuaaa agguucauug    4440 guccaauca cagcucauag guagagcaaa gaaagggugg augauugaa aagauuagcc    4500 ucugucucgg uggcagguuc ccacccucgca agcaauugga aacaaaacuu uuggggaguu    4560
uuauuuugca uuagggugug uuuuuaaguuu agcaaaacau acuuuagaaa caaaugaaaa    4620
aggcaauuga aaucccagc uauuucaccu agauggaaua gccacccuga gcagaacuuu    4680
gugaugcuuc auucugugga aauuugugcu ugcuacugua uagugcaugu gguguagguu    4740
acucuaacug guuuugucga cguaaacauu uaaagugua uauuuuuau aaaaauguuu    4800 auuuuuaaug auaugagaaa aauuuugua ggccacaaaa acacugcacu gugaacauuu    4860
```

```
uagaaaaggu  augucagacu  gggauuaaug  acagcaugau  uuucaaugac  uguaaauugc    4920
gauaaggaaa  uguacugauu  gccaauacac  cccacccuca  uuacaucauc  aggacuugaa    4980
gccaaggguu  aacccagcaa  gcuacaaaga  gggugugcua  cacugaaacu  caauaguuga    5040
guuuggcugu  uguugcagga  aaaugauuau  aacuaaaagc  ucucugauag  ugcagagacu    5100
uaccagaaga  cacaaggaau  uguacugaag  agcuauuaca  auccaaauau  ugccguuuca    5160
uaaauguaau  aaguaauacu  aauucacaga  guauuguaaa  ugguggauga  caaaagaaaa    5220
ucugcucugu  ggaaagaaag  aacugucucu  accaggguca  agagcaugaa  cgcaucaaua    5280
gaaagaacuc  ggggaaacau  cccaucaaca  ggacuacaca  cuuguauaua  cauucuugag    5340
aacacugcaa  ugugaaaauc  acguuugcua  uuuauaaacu  uguccuuaga  uuaauguguc    5400
uggacagauu  gugggaguaa  gugaauucuuc uaagaauuag  auacuuguca  cugccuauac    5460
cugcagcuga  acugaauggu  acuucguaug  uuaauaguug  uucugauaaa  ucaugcaauu    5520
aaaguaaagu  gaugcaacau  cuugua                                           5546
```